(12) United States Patent
Avigni

(10) Patent No.: US 8,205,897 B2
(45) Date of Patent: Jun. 26, 2012

(54) STEERING SYSTEMS FOR USE WITH MOTOR VEHICLES

(76) Inventor: Cristiano Avigni, Los Angeles, CA (US)

( * ) Notice: Subject to any disclaimer, the term of this patent is extended or adjusted under 35 U.S.C. 154(b) by 169 days.

(21) Appl. No.: 12/750,161

(22) Filed: Mar. 30, 2010

(65) Prior Publication Data

US 2010/0326762 A1 Dec. 30, 2010

Related U.S. Application Data

(60) Provisional application No. 61/164,620, filed on Mar. 30, 2009.

(51) Int. Cl.
*B62D 3/12* (2006.01)
(52) U.S. Cl. .................................. 280/93.514
(58) Field of Classification Search .............. 180/400, 180/426–428, 430, 431; 280/93.513, 93.514, 280/93.515
See application file for complete search history.

(56) References Cited

U.S. PATENT DOCUMENTS 7,077,234 B2 * 7/2006 Klais et al. .............. 180/428
2007/0216125 A1 * 9/2007 Baxter .................. 280/93.514

FOREIGN PATENT DOCUMENTS

JP 60244675 A * 12/1985
* cited by examiner

*Primary Examiner* — Faye M. Fleming
(74) *Attorney, Agent, or Firm* — Lathrop & Gage LLP

(57) ABSTRACT

The disclosed steering systems allow Ackermann geometry (i.e., the angle of a vehicle's wheels in relation to each other) to vary at any given angle set by the steering wheel.

12 Claims, 47 Drawing Sheets

FIG. 1B - PRIOR ART

STEERING SYSTEMS FOR USE WITH MOTOR VEHICLES

RELATED APPLICATIONS

This application claims priority to U.S. Provisional Patent Application Ser. No. 61/164,620, filed Mar. 30, 2009, the disclosure of which is incorporated herein by reference.

BACKGROUND

Steering is the term applied to the collection of components, linkages, etc. which will allow for a vessel (ship, boat) or vehicle (car) to follow the desired course. An exception is the case of rail transport by which rail tracks combined together with railroad switches provide the steering function.

The most conventional steering arrangement is to turn the front wheels using a hand-operated steering wheel which is positioned in front of the driver, via the steering column, which may contain universal joints to allow it to deviate somewhat from a straight line. Other arrangements are sometimes found on different types of vehicles, for example, a tiller or rear-wheel steering. Tracked vehicles such as tanks usually employ differential steering—that is, the tracks are made to move at different speeds or even in opposite directions to bring about a change of course.

Many modern cars use rack and pinion steering mechanisms, where the steering wheel turns the pinion gear; the pinion moves the rack, which is a sort of linear gear which meshes with the pinion, from side to side. This motion applies steering torque to the kingpins of the steered wheels via tie rods and a short lever arm called the steering arm.

The rack and pinion design has the advantages of a large degree of feedback and direct steering "feel"; it also does not normally have any backlash, or slack. A disadvantage is that it is not variable, so that when it does wear and develop lash, the only cure is replacement.

Older designs often use a recirculating ball mechanism, which is still found on trucks and utility vehicles. This is a variation on an older worm and sector design; the steering column turns a large screw (the "worm gear") which meshes with a sector of a gear, causing it to rotate about its axis as the worm gear is turned; an arm attached to the axis of the sector moves a pitman arm, which is connected to steering linkage and thus steers the wheels. The recirculating ball adaptation of this design reduces the considerable friction by placing large ball bearings between the teeth of the worm and those of the screw; at either end of the apparatus, the balls exit from between the two pieces into a channel internal to the box which connects them with the other end of the apparatus—thus they are "recirculated".

The recirculating ball mechanism also has the benefit of a much greater mechanical advantage, so that it was found on larger, heavier vehicles while the rack and pinion mechanism was originally limited to smaller and lighter vehicles. Due to the almost universal adoption of power steering, however, this is no longer an important advantage, leading to the increasing use of rack and pinion mechanisms on newer cars. The recirculating ball design also has a perceptible lash, or "dead spot" on center, where a minute turn of the steering wheel in either direction does not move the steering apparatus; this is easily variable via a screw on the end of the steering box to account for wear, but it cannot be entirely eliminated or the mechanism begins to wear very rapidly. This design is still in use in trucks and other large vehicles, where rapidity of steering and direct feel are less important than robustness, maintainability, and mechanical advantage. The much smaller degree of feedback with this design can also sometimes be an advantage; drivers of vehicles with rack and pinion steering can have their thumbs broken when a front wheel hits a bump, causing the steering wheel to kick to one side suddenly (leading to driving instructors telling students to keep their thumbs on the front of the steering wheel, rather than wrapping around the inside of the rim). This effect is even stronger with a heavy vehicle like a truck. Recirculating ball steering prevents this degree of feedback, just as it prevents desirable feedback under normal circumstances.

As vehicles have become heavier and switched to front wheel drive, the effort to turn the steering wheel manually has increased—often to the point where major physical exertion is required. To alleviate this, auto makers have developed power steering systems. There are two general types of power steering systems, hydraulic and electronic, though hydraulic-electric hybrid systems are also possible.

Hydraulic power steering (HPS) uses hydraulic pressure supplied by an engine-driven pump to assist the motion of turning the steering wheel. Electric power steering (EPS) is more efficient than the hydraulic power steering, since the electric power steering motor only needs to provide assistance when the steering wheel is turned, whereas the hydraulic pump must run constantly. In EPS, the assist level is easily tunable to the vehicle type, road speed, and even driver preference. An added benefit is the elimination of environmental hazard posed by leakage and disposal of hydraulic power steering fluid.

An outgrowth of power steering is speed variable steering, where the steering is heavily assisted at low speed and lightly assisted at high speed. The auto makers perceive that motorists might need to make large steering inputs while maneuvering for parking, but not while traveling at high speed. The first vehicle with this feature was the Citroën SM with its Diravi layout, although rather than altering the amount of assistance as in modern power steering systems, it altered the pressure on a centering cam which made the steering wheel try to "spring" back to the straight-ahead position. Modern speed-variable power steering systems reduce the pressure fed to the ram as the speed increases, giving a more direct feel. This feature is gradually becoming commonplace across all new vehicles.

Ackermann steering geometry is a geometric arrangement of linkages in the steering of a car or other vehicle designed to solve the problem of wheels on the inside and outside of a turn needing to trace out circles of different radii.

A simple PRIOR ART approximation to perfect Ackermann steering geometry may be generated by moving the steering pivot points inward so as to lie on a line drawn between the steering kingpins and the centre of the rear axle (see FIGS. 1A and 1B). The steering pivot points of a vehicle 1 are joined by a rigid bar 4 called a tie rod which can also be part of the steering mechanism, in the form of a rack and pinion for instance. With perfect Ackermann, at any angle of steering (e.g., as in FIG. 1B), the centre point 5 of all of the circles traced by all wheels will lie at a common point (e.g., where lines 6, 7, 8, which are respectively perpendicular to individual tires, meet). The centre point 5 may move toward the rear wheels of the vehicle 1 as the steering angle increases, and away from the rear wheels as steering angle decreases. In a vehicle where the Ackermann geometry is not perfect, lines 6, 7, 8 do not intersect in a single point 5. Perfect Ackermann allows for the least amount of wear on tires 2, 3, but may be difficult to arrange in practice with simple linkages. Accordingly, designers are advised to draw or analyze their steering systems over the full range of steering angles.

Modern cars do not use pure Ackermann steering, partly because it ignores important dynamic and compliant effects, but the principle is sound for low speed maneuvers. Some race cars use reverse Ackermann geometry to compensate for the large difference in slip angle between the inner and outer front tires while cornering at high speed. The use of such geometry helps reduce tire temperatures during high-speed cornering but compromises performance in low speed maneuvers.

The Ackermann geometry is commonly measured in terms of percentage, where a perfect Ackermann is measured as "100% Ackermann", a steering geometry where the wheels are parallel at any steering angle—also called "parallel steering geometry"—is measured as "0% Ackermann", and an Ackermann angle smaller than 0% is called as "Inverse", "Reverse", "Inverted" or even "Anti-Ackermann". Along the same lines, a "negative Ackermann" corresponds to a decreasing Ackermann percentage and a "positive Ackermann" to an increasing Ackermann percentage. There is no exact appellation for an Ackermann exceeding 100%, as it corresponds to a geometry for which no use is usually seen, although it certainly brings further alterations to the dynamic motion of the vehicle.

For purposes of illustration, FIGS. 2A through 2G show a PRIOR ART vehicle 700 configured to have different steering geometries. More particularly, FIG. 2A shows vehicle 700 with wheels 701, 702 in a straight position and parallel with each other, as shown by equivalent distances A between parallel planes 703 and 704 that are in line with the wheels 701, 702.

FIG. 2B shows vehicle 700 with the steering wheel in a straight position and wheels 701 and 702 in a toe-in configuration, which is a setting where the front wheels of a vehicle converge when looking at the vehicle from the front.

FIG. 2C shows vehicle 700 with the steering wheel in a straight position and wheels 701 and 702 in a toe-out configuration, which is a setting where the front wheels of a vehicle diverge when looking at the vehicle from the front.

FIG. 2D shows vehicle 700 in a parallel Ackermann geometry configuration, where wheels 701 and 702 remain parallel when turning to the right, as shown by equivalent distances A between parallel planes 703B and 704B that are in line with the wheels 701, 702.

FIG. 2E shows vehicle 700 in a parallel Ackermann geometry configuration, where wheels 701 and 702 remain parallel when turning to the left, as shown by equivalent distances A between parallel planes 703C and 704C that are in line with wheels 701 and 702.

FIG. 2F shows vehicle 700 in a positive Ackermann configuration, which is a setting where the wheel on the inner side of the corner (which in this case is wheel 702), turns at a higher angle than the outside wheel (here wheel 701). The front wheels 701, 702 diverge when viewed from the front of the vehicle 700, notwithstanding the fact that the wheels 701, 702 may be parallel when the steering wheel is in the straight position.

FIG. 2G shows vehicle 700 in a reverse Ackermann configuration, which is a setting where the wheel on the inner side of the corner (which in this case is wheel 702), turns at a lower angle than the outside wheel (here wheel 701). The front wheels 701, 702 converge when viewed from the front of the vehicle 700, notwithstanding the fact that the wheels 701, 702 may be parallel when the steering wheel is in the straight position.

Some modern steering systems—like the ones used in Formula One racing for example—employ what is called a "variable ratio rack," which is a rack having geometry designed to change the steering ratio in relation to the steering angle, meaning that to an increasing steering wheel angle corresponds a higher or lower—usually higher—angle of the wheels. These systems allow the driver to have less steering feedback while traveling on high speed turns, where the steering angle is small, and a higher feedback, where the wheels turn more in relation to the same angle variation, on slow corner where the steering angle is greater. Therefore, this system allows for a different ratio of steering between the steering angle of the steering wheel and the angle of the wheel on the ground, but that at the same time the system is fixed in nature, as the variable parameter is determined by the design of the rack and cannot be altered by the driver.

FIG. 3 shows a PRIOR ART open rack and pinion system 800 like the ones used in car racing. The system 800 includes pinion 801, rack 802, power steering system 803 being fed hydraulics through pipes 804, steering arm 805, and steering column connection hub 806.

FIG. 4 shows a PRIOR ART steering box 810 of the 2009 Formula 1 world champion contender Brawn GP race car. The steering column and pinion (collectively marked as 813) describes the view from the exterior of steering box 810 of the pinion location and steering column end which lay behind the outside cover mould. FIG. 4 also shows steering arms 811A, 811B and hydraulic pipes 812.

BRIEF SUMMARY

The disclosed steering systems allow Ackermann geometry (i.e., the angle of a vehicle's wheels in relation to each other) to vary at any given angle set by the steering wheel.

BRIEF DESCRIPTION OF THE DRAWINGS

FIG. 1B shows the PRIOR ART Ackermann system of FIG. 1A, making a left turn in a perfect Ackermann configuration.

FIG. 12a shows pinion 100 and rack 110.

FIG. 14b is a front perspective of FIG. 14a.

DETAILED DESCRIPTION

With dimensions and mass (e.g., wheelbase, track width, height, and weight), Ackermann geometry is one of the fundamental parameters in the motion dynamics of a vehicle. According to the specific use a vehicle is designed for, the Ackermann geometry can vary greatly, and a perfect Ackermann configuration is not generally employed for vehicles. Although a perfect Ackermann theoretically provides what may seem to be the most logical and efficient way of conceiving a steering geometry, the dynamics of a vehicle very often require Ackermann settings that are so far from a perfect Ackermann to seem in clear contrast with the sheer logic of a system designed to produce the steering of a vehicle. This is the case of extreme inverse Ackermann settings, where the inside wheel clearly points the vehicle in a direction which goes against the direction set by the outside wheel. This demonstrates that the Ackermann is a parameter which greatly affects the general handling of a vehicle.

While in most vehicles parameters like toe and camber are easily accessible and are checked and reset regularly—operation which is usually done when changing tires for instance, in order to ensure a good tire efficiency—changing the Ackermann geometry in a vehicle is an option which is not available, as it would require the changing of the points where the steering arms are connected to the wheel hub and the relative lengthening or shortening of the steering arms themselves. There would also need to be an adjustment of the steering ratio, as the changing of the connecting point between wheel hub and steering arm would change the ratio of steering between steering wheel angle and the angle of the wheel on the ground. On top of being a complicated operation, the whole issue is not deemed beneficial, as going from a fixed Ackerman geometry to another fixed Ackermann geometry would produce benefits on one side and create negative effects on the other. The issue is resolved by assuming that the fixed parameter a vehicle is born with was conceived to be the best compromise for the multiple changing conditions a vehicle may encounter while moving.

Proof of the fact that the Ackermann geometry is a parameter which is not accessible, and that as a result it does not get changed, is the fact that in the racing world (where the goal is ultimate performance), in order to modify the handling of a vehicle the Ackermann geometry is modified by operating directly on the toe. This operation is far from being ideal, since while having a direct effect on the ultimate Ackermann geometry, it is quite limited in its range and it bears heavy collateral effects. For example, operating on the toe means the loss of parallel wheels on a straight line or the loss of the ideal parallelism if that was to be defined as a toe in or toe out setting. Nevertheless, this method of altering the Ackermann through acting on the toe is often employed in Karting or small scale model series.

Figure 1A:
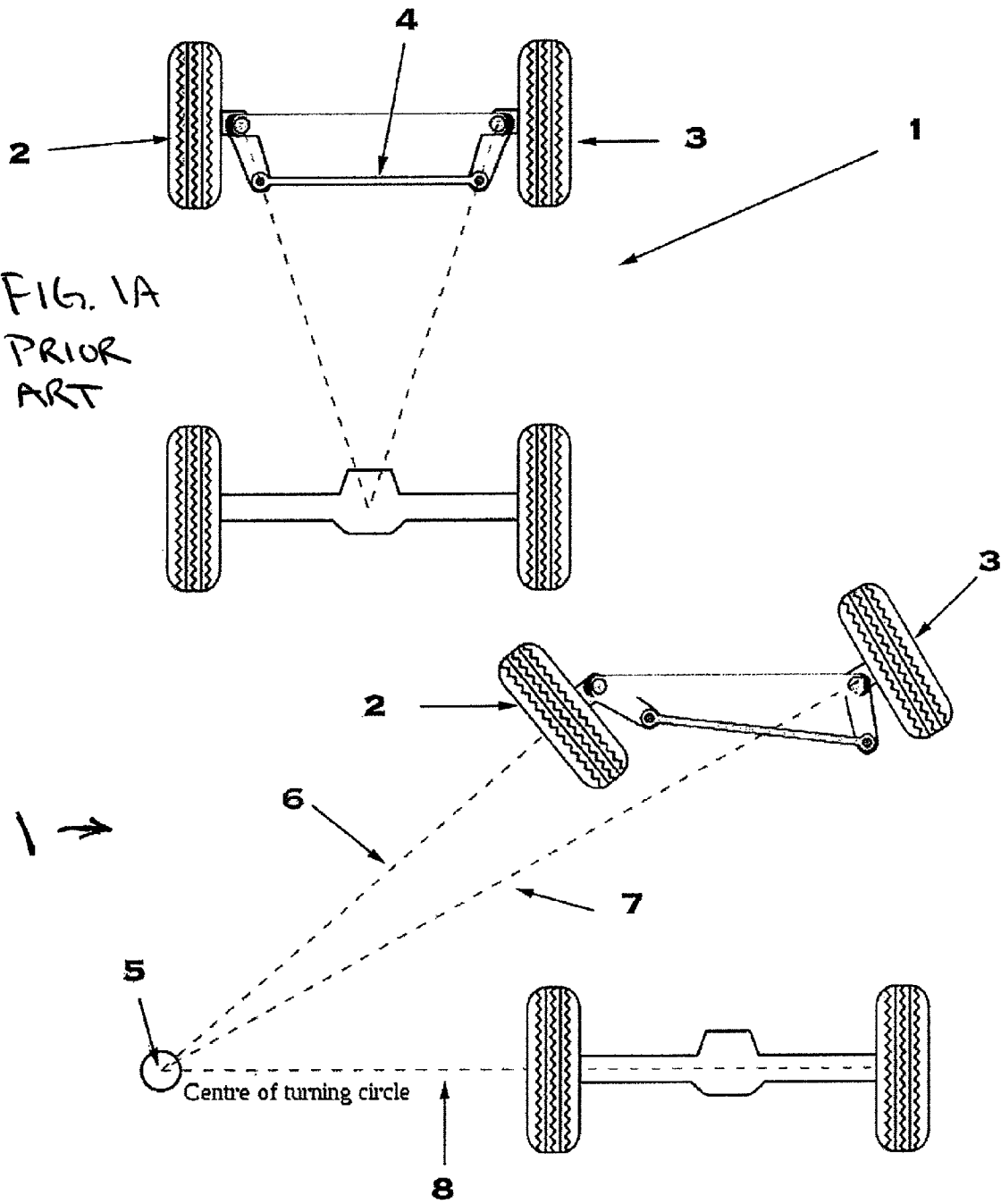
FIG. 1A shows a PRIOR ART Ackermann system, with wheels in a straight position.
Figure 2A:
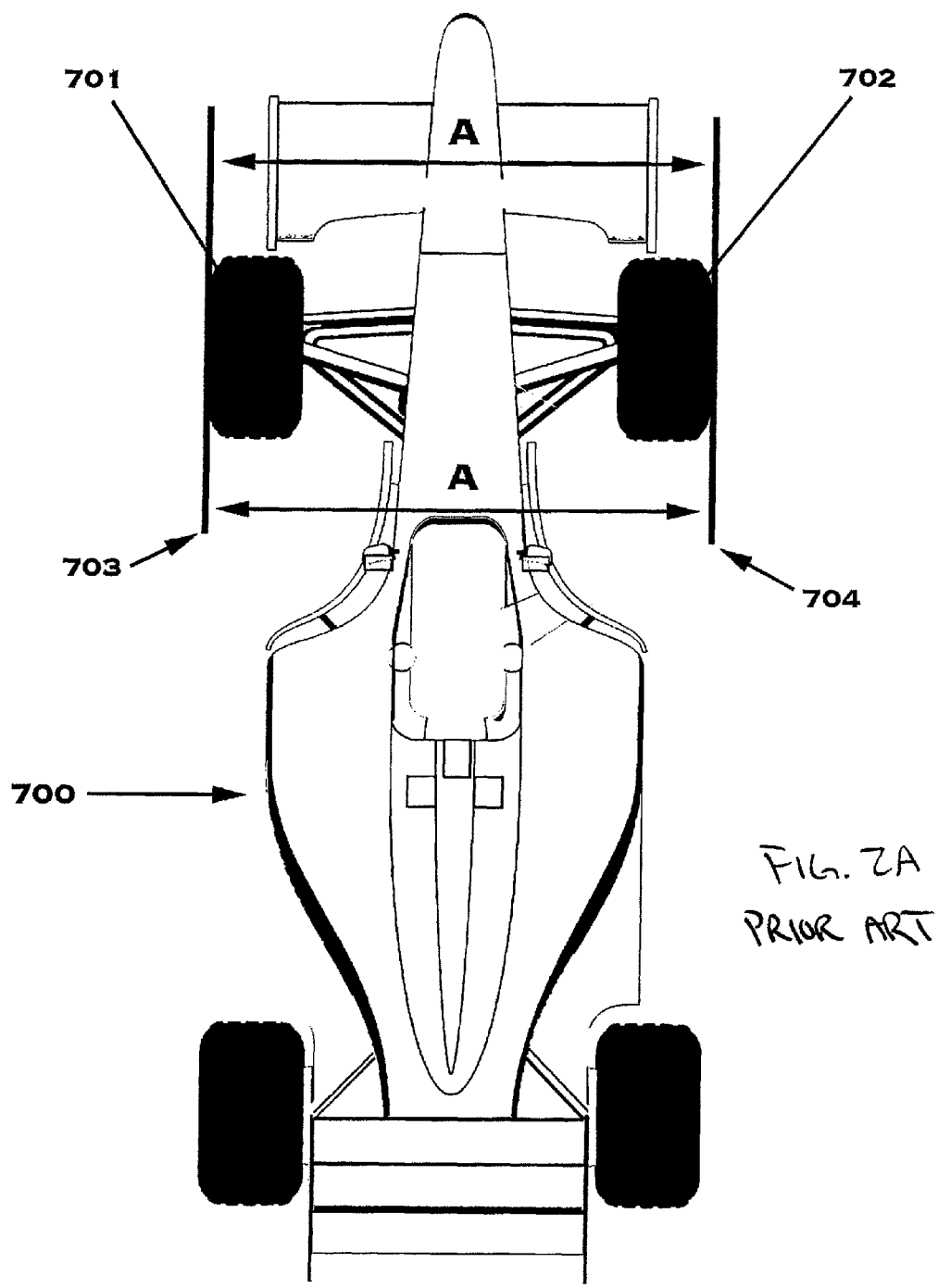
FIG. 2A shows a PRIOR ART vehicle with the steering wheel in a straight position and wheels parallel with each other.
Figure 2B:
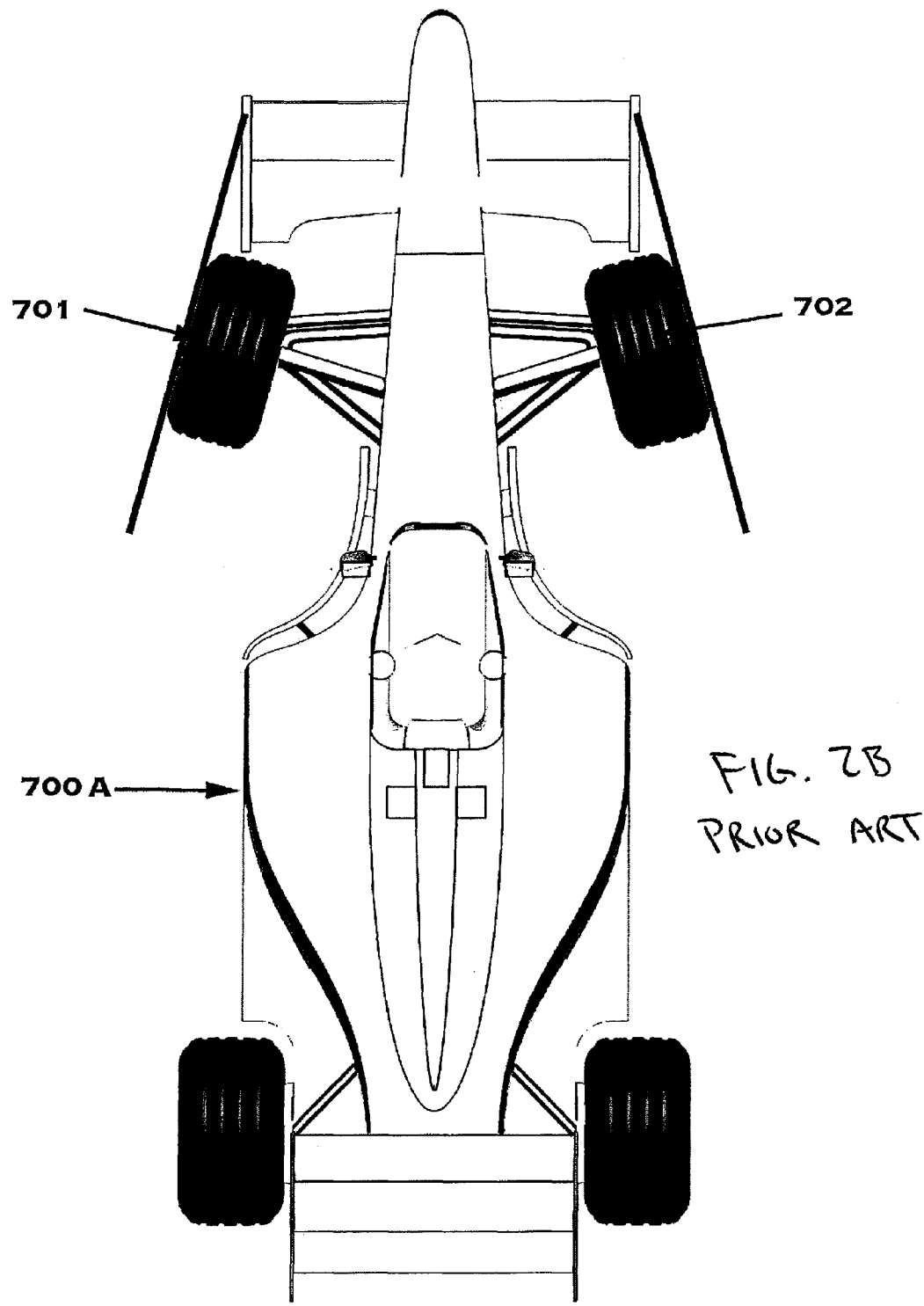
FIG. 2B shows a PRIOR ART vehicle featuring a toe-in configuration.
Figure 2C:
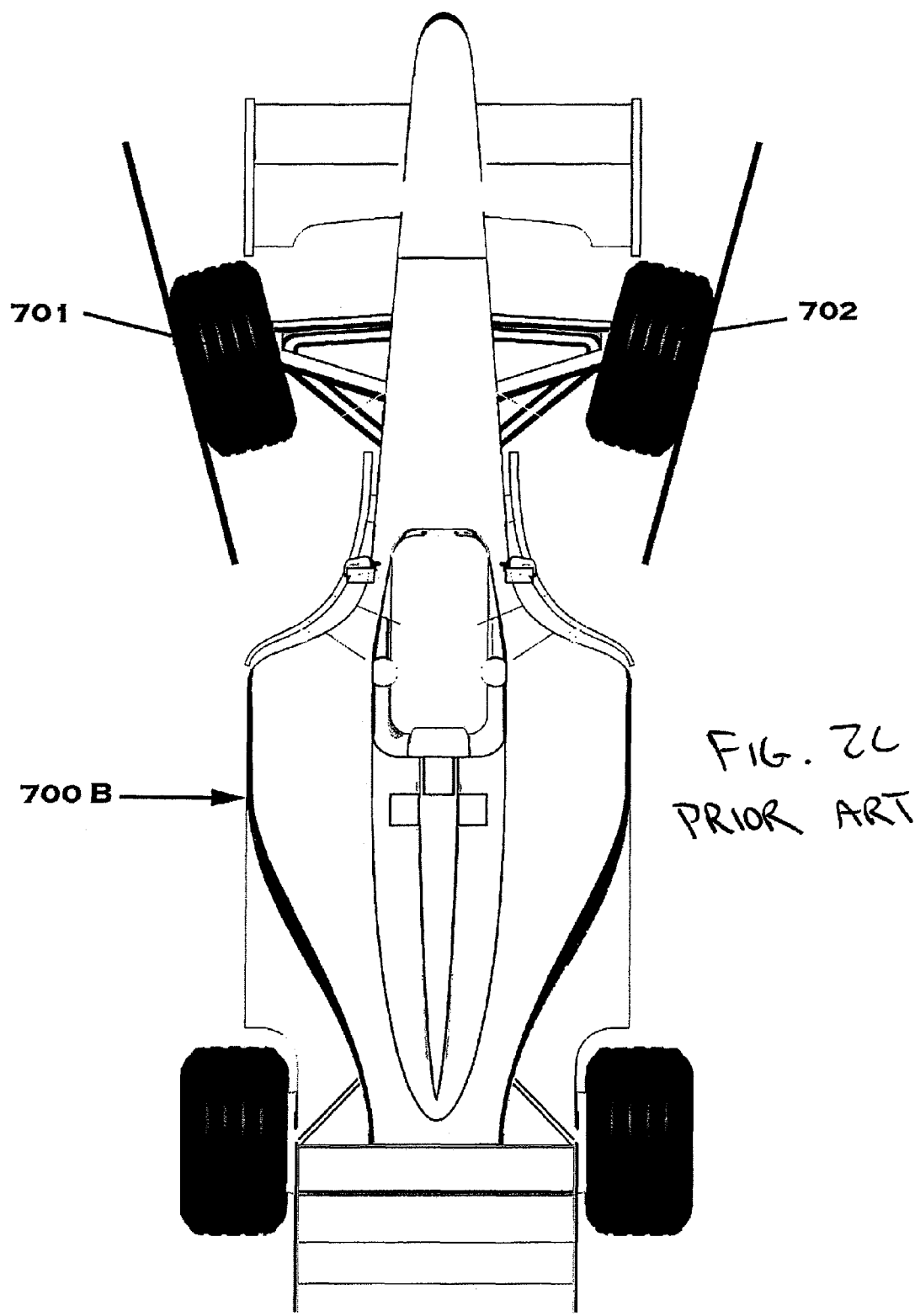
FIG. 2C shows a PRIOR ART vehicle featuring a toe-out configuration.
Figure 2D:
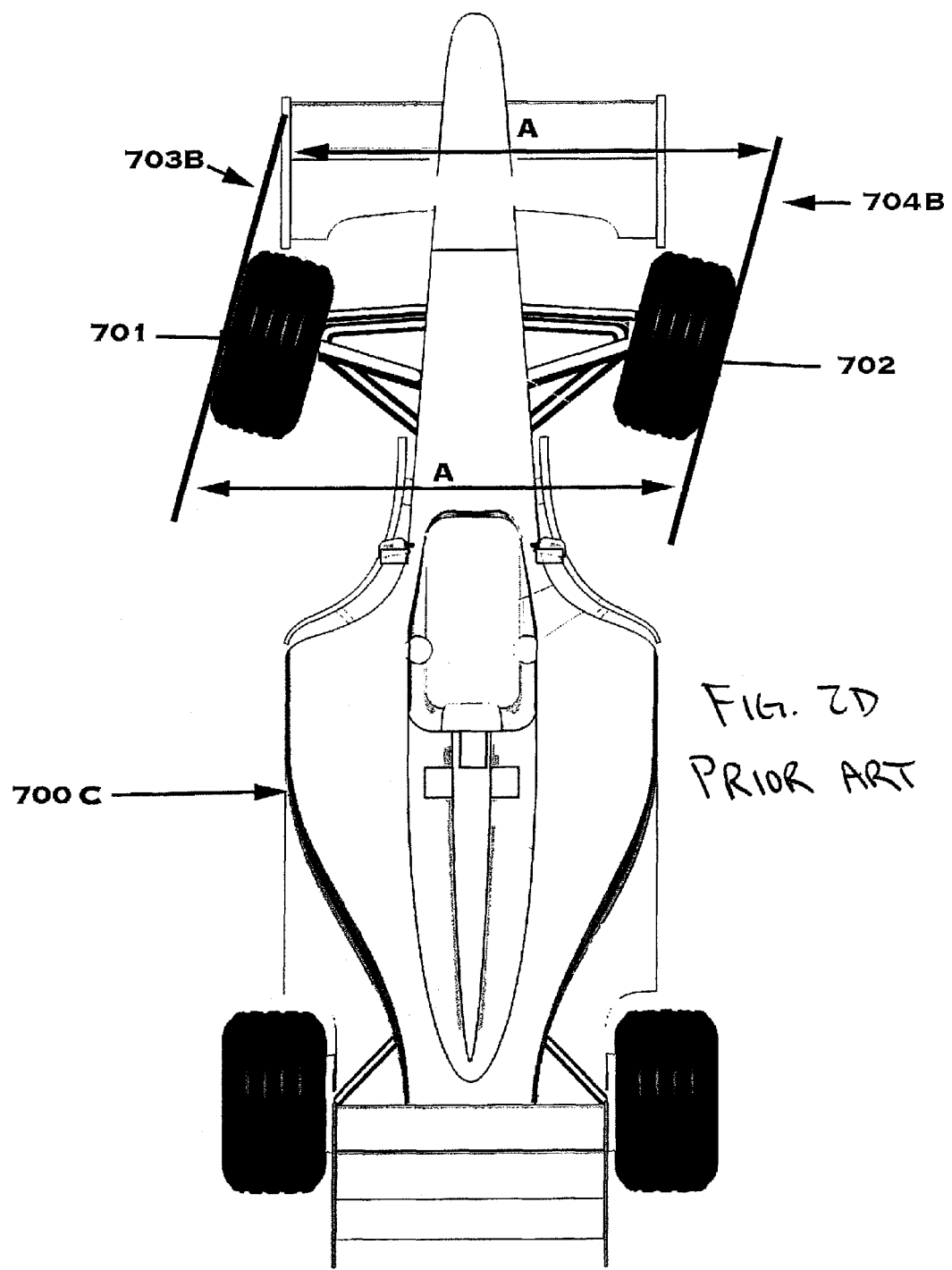
FIG. 2D shows a PRIOR ART vehicle making a right turn in a parallel Ackermann geometry configuration.
Figure 2E:
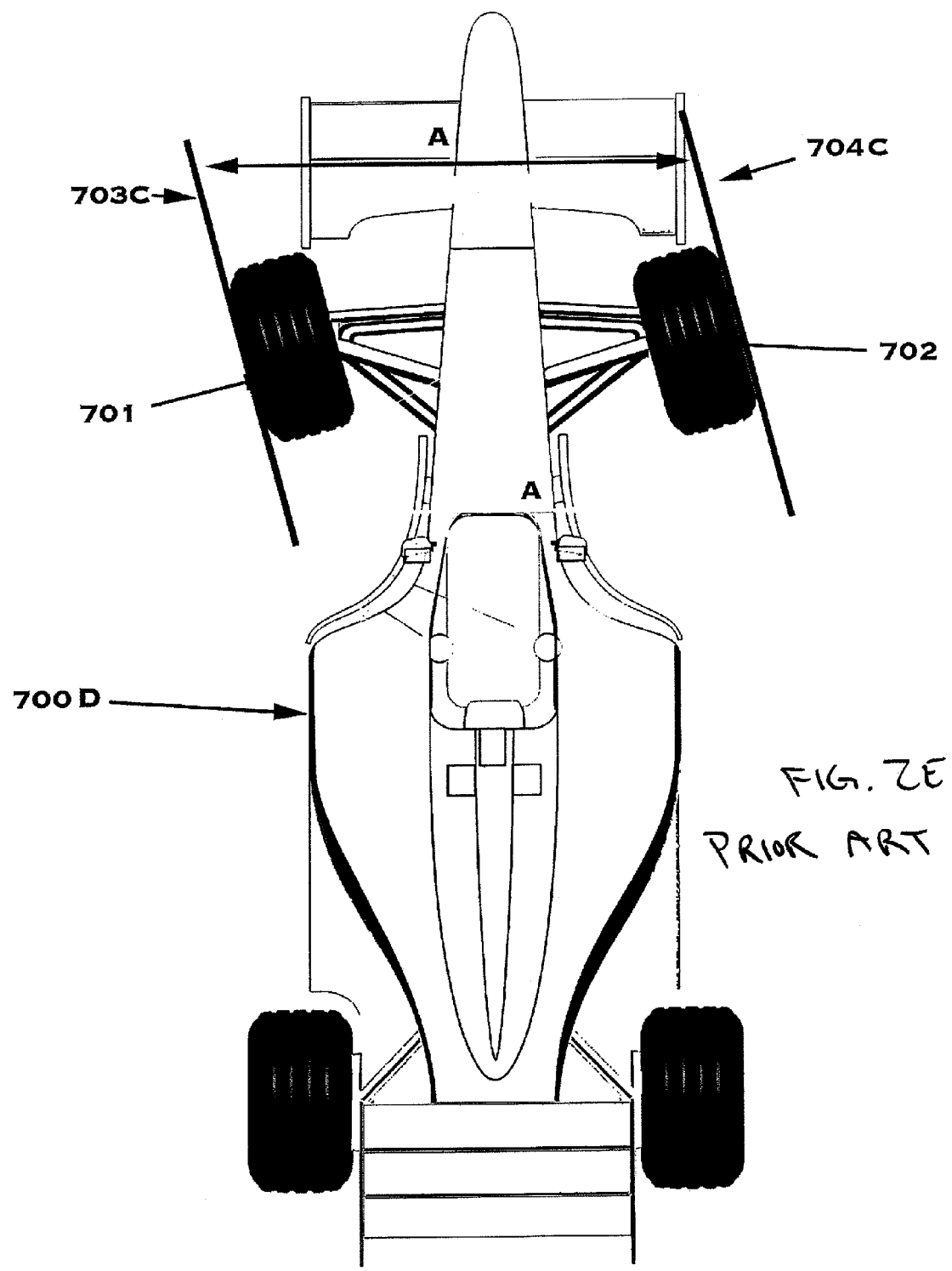
FIG. 2E shows a PRIOR ART vehicle making a left turn in a parallel Ackermann geometry configuration.
Figure 2F:
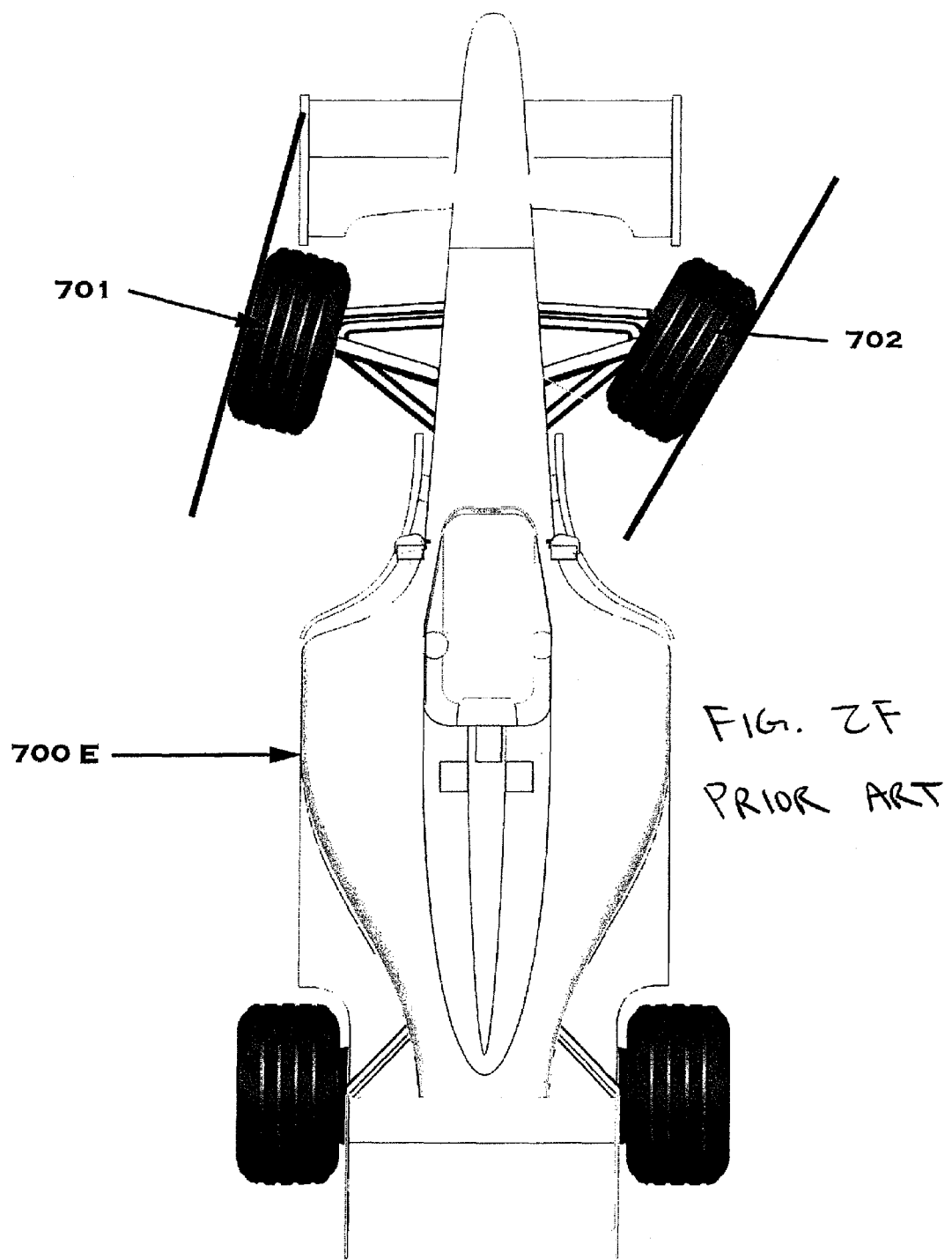
FIG. 2F shows a PRIOR ART vehicle in a positive Ackermann configuration.
Figure 2G:
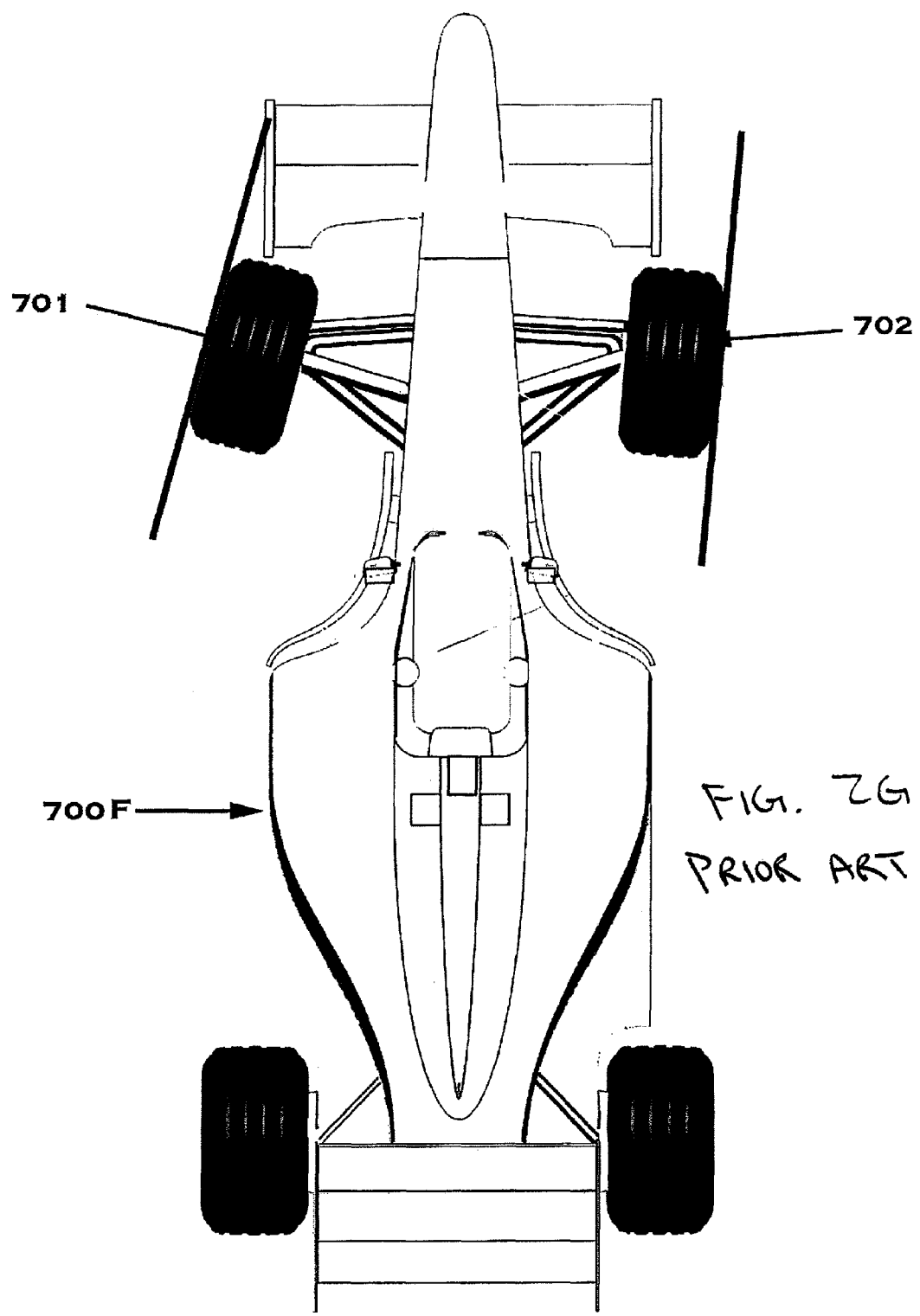
FIG. 2G shows a PRIOR ART vehicle in a negative Ackermann configuration.

In reality, the great range of factors a vehicle encounters when in motion (e.g., speed, surface conditions, temperature, load and weight changes coupled with the vehicle's tire conditions, aerodynamics, etc.) call for different Ackermann geometries in order to retain the optimum car balance and enjoy the best handling. Technically, changing the Ackermann geometry triggers a lateral load transfer between the front wheels, and more specifically part of the load is transferred from the inside wheel to the outside by decreasing the Ackermann (e.g., by moving from a perfect Ackermann to a progressively negative Ackermann), and inversely, increasing the Ackermann results in a partial load transfer from the outside wheel to the inside one. This has various repercussions, one of the most obvious being drag, which is directly related to tire temperature. Tire temperature, in turn, is linked to tire wear and tire efficiency expressed in terms of grip. This is easily understandable by looking at FIGS. 1A and 1B, showing that a vehicle 1 with perfect Ackermann creates the least amount of resistance and the best efficiency in terms of power economy, whereas a vehicle like race car 700 in FIG. 2G presenting a negative Ackermann is confronted with a high drag factor since the direction of the inside wheel converges to the direction of the outside wheel. In this latter case, the drag is proportional to the steering angle and increases with it.

Dynamic factors which become paramount with the increase of speed (e.g., aerodynamics), bear a great deal of influence in the ultimate load distribution to the four tires of a vehicle—and in turn to the ground—which determines the ultimate balance and handling of the vehicle. The interplay of these factors may call for an extremely high level of negative Ackermann, the unwanted collateral effects of which—like high levels of drag around tight corners—are compensated by the gains in the handling when the vehicle moves through fast corners.

Figure 3:
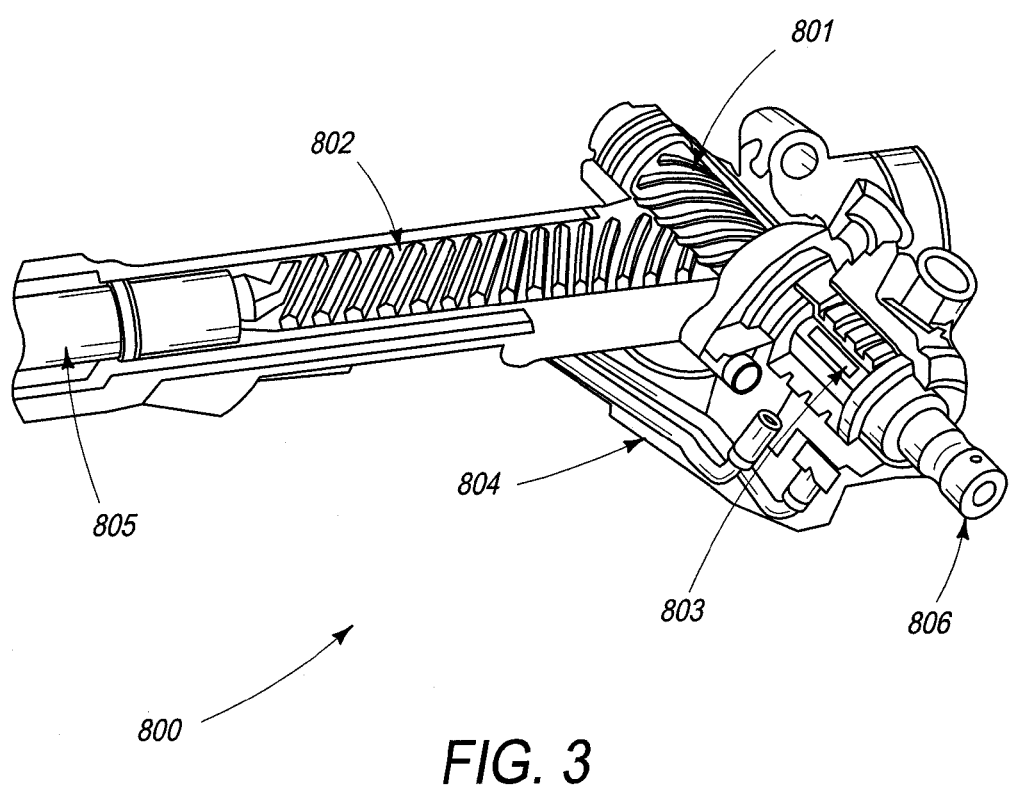
FIG. 3 shows a PRIOR ART open rack and pinion system.
Figure 4:
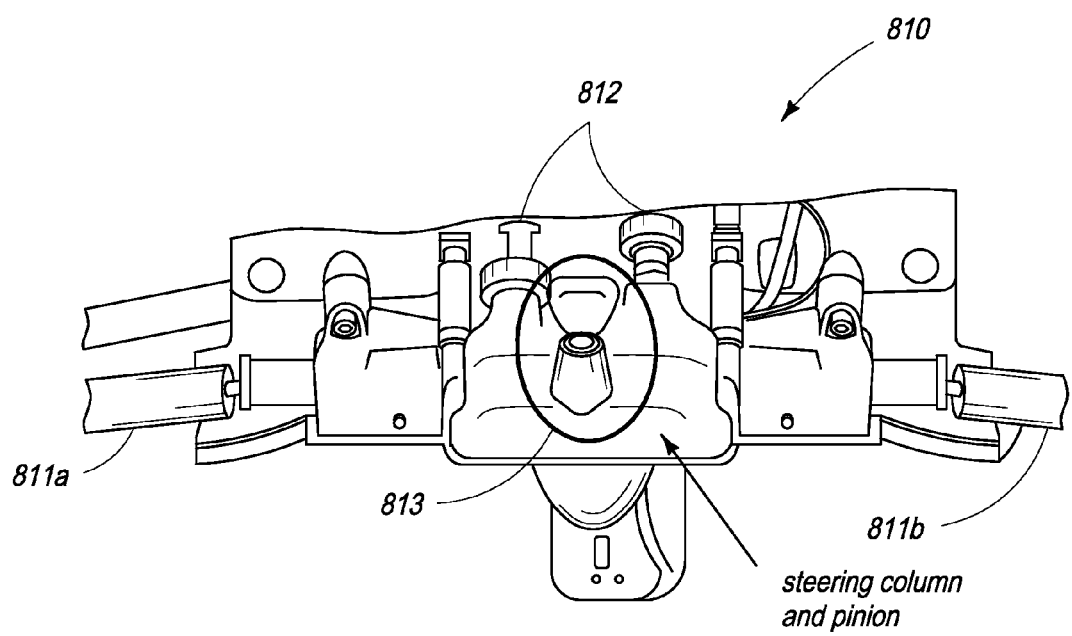
FIG. 4 shows a PRIOR ART steering box.

Unlike several other functions which have evolved to become dynamically adaptive to the various and changing needs of a vehicle in motion, the Ackermann geometry has remained a function which can be set in many different ways, but becomes fixed once set. In fact, there is no prior art system designed to vary the Ackermann geometry in order to adapt it to the changing conditions encountered by a vehicle in motion. There are various reasons for this, including that, although it would be very easy to conceive of a variable Ackermann system operating the variation by simply changing the steering arm lengths through the use of hydraulic systems, the default of any such system would bear consequences which surpass the gained efficiency through the use of such systems. For example, the consequences that may directly impact the safety of the vehicle itself and its occupants. Accordingly, even the most advanced car racing disciplines—although adopting very evolved devices—still rely on very basic rack and pinion systems, as seen in FIGS. 3 and 4.

The steering systems disclosed herein may improve safety, efficiency, and performance by allowing a fixed Ackermann parameter to become variable without losing any of the benefits of standard steering systems (e.g., continuous contact between hard parts on linkage between a steering wheel and wheels). Further, the disclosed steering systems may also be used to change steering ratio between steering wheel and wheels on the ground.

More particularly, disclosed steering systems may allow Ackermann geometry to vary by modifying the turning angle of the inside wheel independently from the outside wheel, while still maintaining the same toe when the steering wheel is straight. Toe defines the relative parallelism between the front wheels when the steering wheel is in a straight position, and the front wheels can be diverging, parallel, or converging as shown in FIGS. 2A through 2C, discussed above.

As discussed in more detail and with reference to the drawings below, disclosed steering systems may allow a vehicle to adopt a reverse Ackermann angle on fast corners and, according to the decreasing speed, move to a perfect Ackermann angle when moving slowly thus minimizing tire wear, or adopt a very high Ackermann angle to offset vehicle understeer on icy conditions. In some embodiments, the disclosed steering systems include a purely mechanical system, where a specifically designed rack-pinion system varies the Ackermann geometry. Other disclosed steering systems are hydraulic, where the length of the rack or the steering arm can be modified to achieve the same results.

Figure 5:
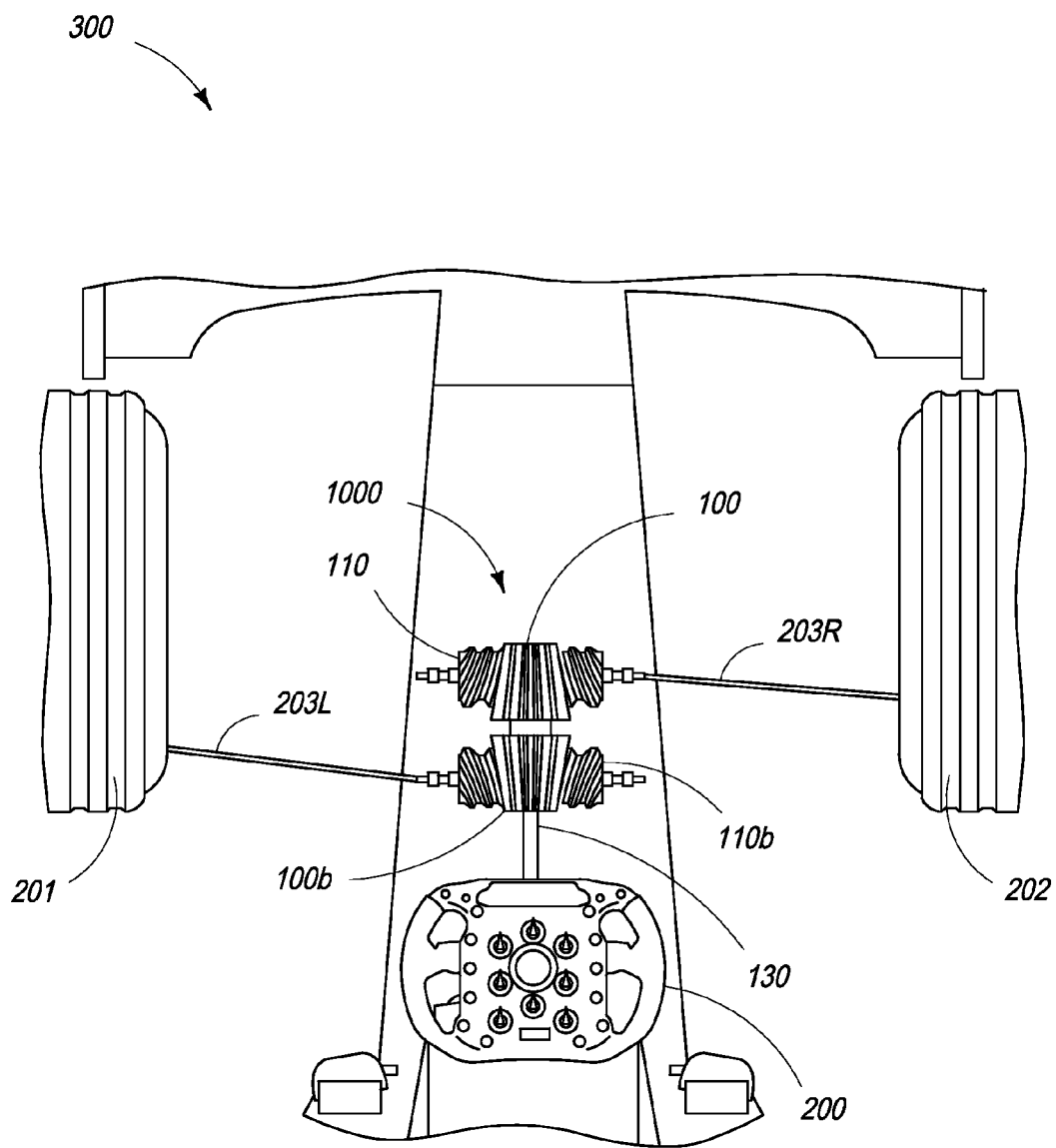
FIG. 5 shows a steering system 1000 according to an embodiment, in a vehicle 300.

As shown for example in FIG. 5 and discussed below, a steering system 1000 in vehicle 300 featuring steering wheel 200 attached to steering column 130 on which the steering system 1000 is fixed. The steering system 1000 may include two racks 110, 110B that are each assigned to a dedicated pinion 100, 100B (or the two pinions can be designed and conceived as one specifically designed pinion acting on both racks). Each specifically designed rack is connected to a dedicated steering arm which is in turn connected to a single wheel. Rack 110 is fixed to steering arm 203R which is linked to wheel 202, and rack 100B is attached to steering arm 203L which is linked to wheel 201. The two racks, through two independent steering arms, are each connected to a wheel, although both are being activated by the movement of their dedicated pinion fixed on the same steering column operated by the same single steering wheel. Thus, to each wheel corresponds a dedicated rack/pinion set. The pinion or pinions are attached and fixed to the steering column, while the two racks are independent from each other but at the same time activated by the rotation of the same steering wheel/steering column apparatus which acts on a specifically designed single pinion or two individual pinions.

Various embodiments of steering systems are disclosed herein where, through the application of the double rack/pinion system, a variation of the Ackermann geometry becomes possible. One embodiment includes two conical pinions and two cylindrical racks; the teeth on the racks are developed as rings along the curved side of the rack's surface. The racks can be placed one in front of the other more or less perpendicularly to the steering column. For sake of simplicity, we will consider here a system where the two racks are placed perpendicularly to the steering column one in front of the other. The racks can move in two ways: they can move perpendicularly to the steering column as a consequence of the turning of the steering wheel/column/pinion (e.g., to change the vehicle's direction, similar to standard single rack systems), and they can also rotate longitudinally and travel by rolling on their respective pinions in a direction which takes them closer or further away from the steering wheel. Those skilled in the art will appreciate that steering systems may include racks that simply turn on their axis to access different ratio settings, without any travel along the pinion's surface.

By rotating and traveling on the conical pinion, each rack may intersect its pinion at different points between the pinion's small and large bases. This may make each rack capable of traveling different distances—in its perpendicular motion relative to the steering column, which is the motion moving the steering arms and wheels—in relation to the same steering angles. This means that, for example, if on a standard, fixed steering system a 90° steering wheel angle may correspond a rack travel of 3 inches, a disclosed steering system at the same steering wheel angle could correspond a range of rack travel between 2 and 4 inches according to the position of the intersection between the rack and its pinion.

Considering an embodiment featuring conical pinions, the rack will travel a shorter distance as it intersects the pinion closer to the pinion's small end, and will travel bigger distances as the intersection between rack and pinion approaches the larger base of the conical pinion. By being able to travel variable distances in relation to the same steering angle, the rack will alter, in turn, the angle of the wheel. Different Ackermann geometries can be produced by controlling the rotation of each rack independently, causing the racks to travel different distances in relation to each other.

One way of using the disclosed steering systems to access multiple Ackermann geometries without altering the steering angle of the vehicle is to keep the rack corresponding to the outside wheel operating on a constant plane (e.g., the neutral plane that the standard single rack system would use) and have the rack corresponding to the inside wheel rotate on its pinion to vary the Ackermann geometry by acting exclusively on the angle of the inside wheel. Notwithstanding the fact that the steering system will act as a conventional steering system if the racks do not move, it becomes apparent that to access multiple Ackermann geometries the racks will move alternatively to access a neutral parameter when corresponding to the outside wheel while the other rack adopts the rotation corresponding to the desired Ackermann by altering the inside wheel angle (and vice versa, with inverted positions for the opposite turn). In this system, the racks could be set on a neutral plane while the vehicle travels on a straight line and, through a mechanical or electronic system which detects steering wheel motion on either side, the rack corresponding to the inside wheel may be triggered to rotate and move along its pinion to the point corresponding to the desired Ackermann setting. As the steering wheel returns to the straight position, the rack which originally rotated may resume its position on the neutral plane along with the other rack.

Another embodiment of the disclosed steering systems includes two cylindrical racks and two pinions, each forming a rack/pinion set acting on a wheel. In this embodiment, each pinion is designed on a structure which develops longitudinally, resembling to a cylinder-shaped gear rather than a thin clock gear.

Each respective rack and pinion set is designed to have two sections with different ratio to each other. The sections can be accessed by turning the steering wheel; one section being accessed as the steering wheel turns clockwise and the other while it turns counterclockwise. These sections can include, for example, a fixed-ratio portion for half the pinion and a variable-ratio one for the other half, and portions that correspond to the pinion's geometry on the rack. Alternately, the two sections of the rack/pinion set may be of a variable nature; one may bring about a variable Ackermann geometry, whereas the other will remain fixed in ratio regardless of any rack rotation.

We consider here, as an example, a steering system having two rack/pinion sets, each featuring a fixed half and a variable Ackermann half. Each pinion is designed so that, when viewed in a radial sense, it is composed of two halves—one having a fixed ratio, the other half a variable Ackermann. When viewed from above, the pinion's fixed ratio half structurally corresponds to a half cylinder; its variable Ackermann geometry half can be designed in multiple ways (e.g., a decreasing ratio section, an increasing ratio section, or both). This shape can be better visualized by thinking of half a cylinder for the fixed ratio section and half a spiraling cone for the variable Ackermann section; according to the way the two halves are built, the plane where the two halves meet (e.g., the longitudinal plane, perpendicular to the steering column along which the circumference of the pinion is equal to a circle) may lay in the small base of the conical half, the large base, or between the two ends of the conical half. A decreasing ratio half may be characterized by the surface of the pinion drawing progressively closer to the central axis of the steering column, whereas an increasing ratio will move away from it. When viewed from above, a decreasing distance will be represented by the spiral curve which, from the furthermost point located at one end of the fixed ratio half, rotates towards the other end of the fixed ratio half but at the same time also travels progressively towards the center of the steering column to finally end up against the other end of the cylindrical half but at a shorter distance from the center. If we considered the starting point of the fixed ratio half to be at 0°, then at 180° the fixed ratio half would have terminated and the variable Ackermann half would start its progressively decreasing-distance-spiral pattern until at 360°—which coincides with 0°—the variable Ackermann half would terminate at a point closer to the center than the beginning of the first half In the case of an increasing-distance variable Ackermann ratio, at 180° the distance between the center and the outer point of the pinion would increase progressively and the variable Ackermann half would end at 360° at a point further from the center than the 0° point starting the fixed ratio half The two rack/pinion sets may be designed symmetrically, so that the fixed ratio of one corresponds the variable ratio of the other.

Each rack may be able to rotate on its axis, with its teeth developing as rings around its circular structure. As the rack turns, it also moves longitudinally on the pinion, from one end of the pinion to the other, in order to match the tooth ratio of the pinion with the one corresponding to its turning surface. The rack, therefore, can move both in a radial sense as well as longitudinally on the pinion; it moves in a radial way pulling or pushing the steering arm attached to it and turning the wheel on either side as a consequence of the turning the steering wheel and pinion, and longitudinally along the pinion by rotating on its axis as a consequence of a manual, mechanical, or electronic input in order to activate a different Ackermann geometry.

The variable Ackermann geometry half of the rack matches the variable Ackermann geometry half of the pinion. Focusing on a steering system where face A of the pinion is a circle (structurally speaking) and face B has an increasing ratio half (the other half corresponding to the relative fixed ratio half of face A), the rack is configured so that when intersecting with the teeth of the pinion close to face A, it will provide the same radial length when the steering turns to the left or the right. In other words, to a set angle of rotation of the steering wheel, the rack intersecting the pinion at a point close to the pinion face A (where the pinion structure is a circle), the rack will pull or push the steering arm the same distance in either direction. If the rack is made to move longitudinally on the pinion towards the pinion's face B, (e.g., by rotating on its axis), then the length traveled by the steering arm when the steering wheel rotates to the side corresponding to the variable Ackermann geometry ratio side of the pinion, will be greater than the distance traveled by the same arm in the other direction if the steering wheel was turned at the same angle to the other side.

Considering the case discussed above where face A of each pinion is circular, when both pinions are set to interact with the racks close to face A, the system is equal to a conventional steering system composed of two rack/pinion sets instead of one, since the steering wheel can be turned to either side and both rack/pinion sets will pull or push their respective arms the same distance (because both halves of each system have the same ratio). As both racks rotate and travel on their respective pinions longitudinally towards the pinions' face B, the turning of the steering wheel to one side will correspond to one rack/pinion set operating on its fixed ratio half, while the other rack/pinion set will operate on its variable ratio half. The result will be that the two steering arms will travel a different distance in relation to each other, which will make for one wheel—the wheel attached to the rack operating at the time on its variable Ackermann half—to turn at an angle different from the angle set by a conventional, fixed ratio steering system.

Different Ackermann geometry settings cause a change in the steering capability of a vehicle, such as by offsetting (totally or in part) any under or over steering the vehicle may experience. This may be due to the fact that by changing the Ackermann geometry there ensues a variation in the way the load is distributed laterally, between the inside and outside wheels. This load transfer causes a variation in the grip factor of the front end of the vehicle which, in turn, may trigger the inverse effect at the back end of the vehicle.

The disclosed steering systems may be operated manually or electronically (e.g., via one or more levers), or may be activated by software which calculates a range of parameters like steering angle, wheel rotation, speed, acceleration, etc. to determine the ideal setting of the Ackermann geometry at any point in time. These steering systems may be particularly effective when road condition are uneven or difficult (e.g., roads with ice, patches of ice, or other moisture), as the level of stability (and therefore of safety of the vehicle) may be increased. At the same time, tire and fuel efficiency may be optimized.

Figure 6:
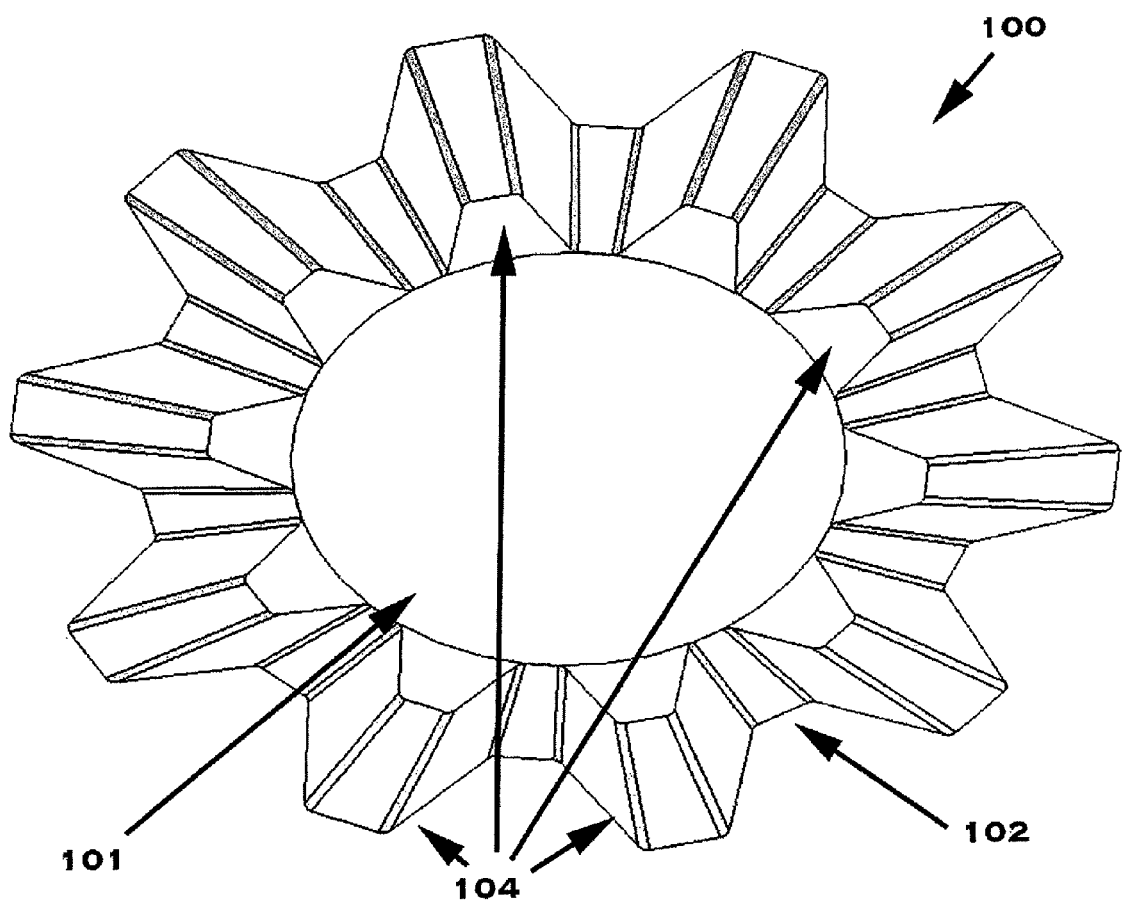
FIG. 6 shows an end view of a conical pinion 100 for use in the steering system 1000.
Figure 7:
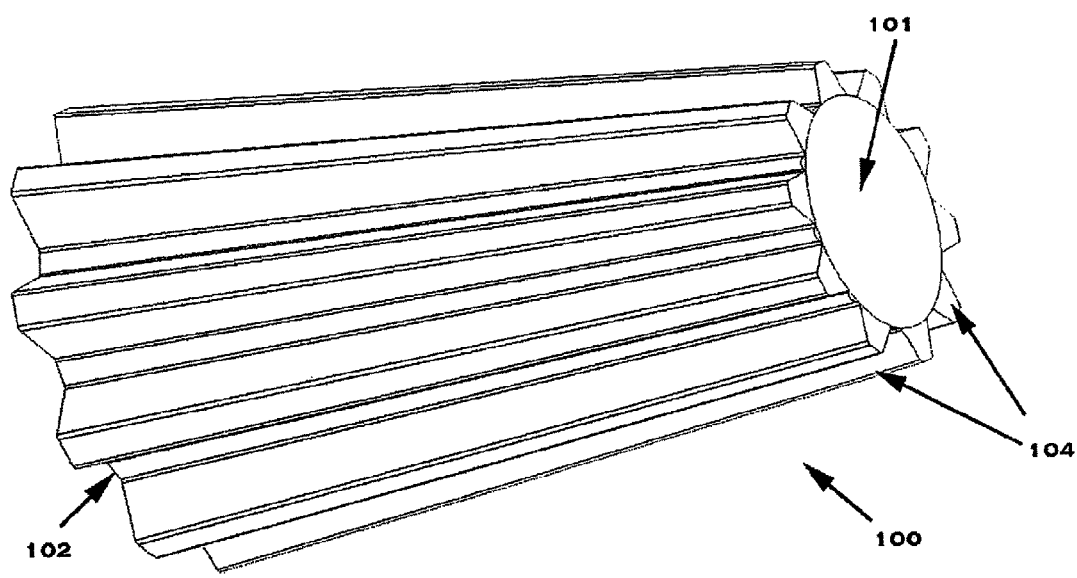
FIG. 7 shows a perspective view of the pinion 100.

As those skilled in the art will appreciate, steering angle can correspond to any measure of lateral motion of a rack interacting with a pinion, according to the pinion's dimensions. The bigger the circumference of the pinion, the longer the distance of travel for the same angle. In the same way as for the Earth's parallels, the distance a traveler will have to walk to cover the space between two meridians at the tropics is less than the one he will cover if walking between two meridians following the equator line but more than the one he will cover if walking on the arctic circle—this simply because the circumference of the Earth increases as we proceed from the poles to the equator. As the rack's travel is dependent upon the circumference of the pinion, a conical pinion (e.g., pinion 100 shown in FIG. 6 and FIG. 7) will provide a range of circumferences on all the planes contained between its small and large bases. The pinion 100 includes a small base 101, an opposite base 102 (hidden by the body of the pinion 100), and teeth 104. The primary difference between the Earth example and the pinion 100 is that the increasing circumference develops on a straight line for the pinion, whereas in the Earth's case it develops on a curve. A spherical (or semispherical) pinion can be included in various embodiments in place of the conical pinion 100, as an alternative solution accomplishing the same task.

A rack intersects the conical pinion 100 along planes that extend parallel to bases 101, 102. Accordingly, the rack is conceived to have a curved surface which allows it to rotate on its axis and roll longitudinally on the pinion 100. This motion between the two bases 101, 102 of the conical pinion 100 may allow the rack to travel different distances in relation to a set angle of rotation carried out by the pinion 100; this corresponds to our traveler being able to choose whether to increase or decrease its journey between two meridians by switching between parallels—parallels which represent the planes between the two bases 101, 102 of the conical pinion 100.

Figure 8:
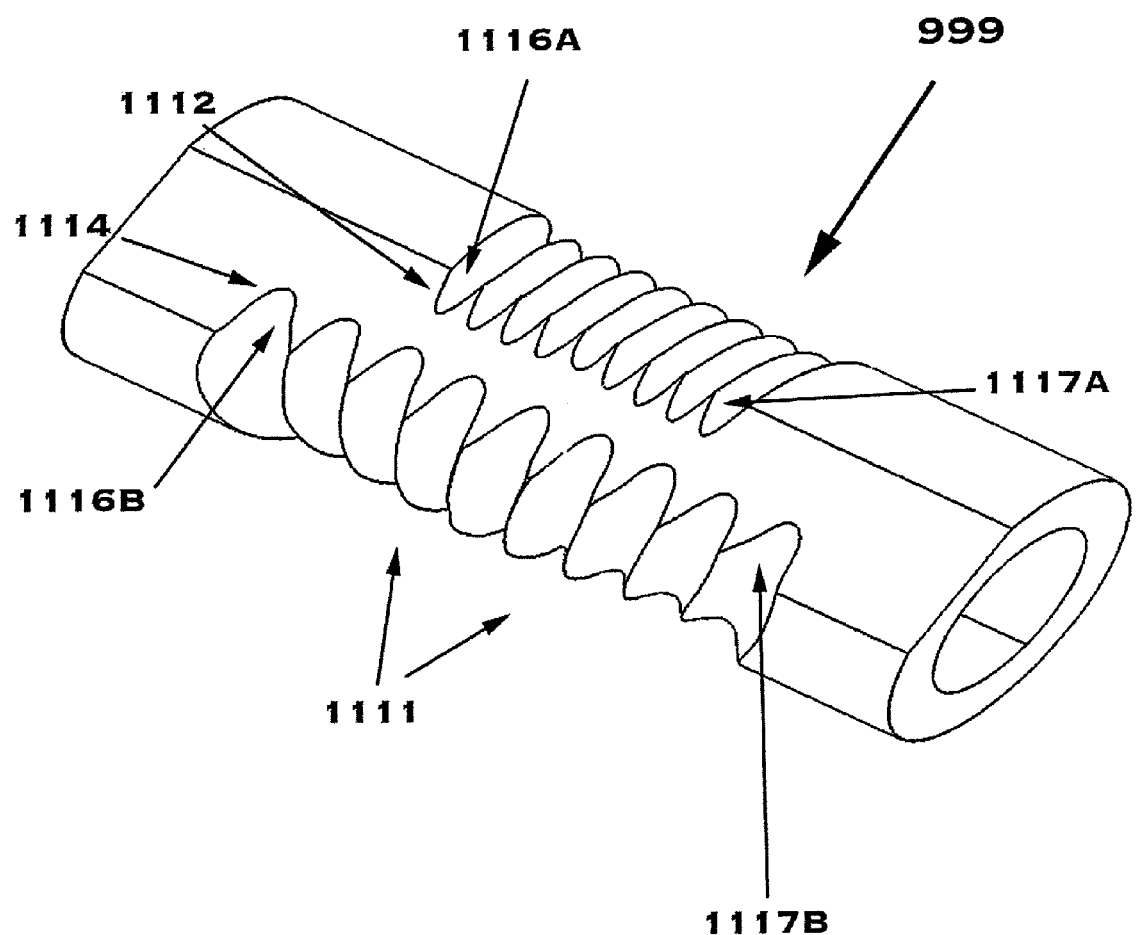
FIG. 8 shows a perspective view of a rack 999.

The toothed surface of the rack, which on a traditional steering system is flat, may be curved in the disclosed systems to allow smaller teeth to give way to larger teeth intersecting the pinion and vice versa, like a gear system where the rotation and roll of the rack on the conical pinion can be compared to the changing of gears in a continuously variable transmission system. In FIG. 8, for the same full pinion rotation from side to side, rack 999 will move laterally any distance between points 1116A-1117A and points 1116B-1117B according to the rotation and roll of rack 999 on the pinion, motion which will determine its intersection point with the pinion anywhere between side 1112 and side 1114. In the same manner, our Earth traveler represents the intersection point between rack and pinion, as our Earth has become more like a cylinder when embodied by rack 999; if the surface of rack 999 containing teeth 1111 was to be extended to cover the surface of an hemisphere, side 1112 of the rack could be compared to the arctic circle, side 1114 the equator and each of the teeth 1111 an Earth meridian.

Once the method of rack travel variation for a set rotation angle of the pinion has been established, the steering systems work by making each front wheel (considering a vehicle with front steering system) dependent on a dedicated rack/pinion set. This means that the system will consist of two rack/pinion sets (one for each wheel), making the front wheels independent from each other. The independency of the front wheels from each other is given by the capability of each rack to change their longitudinal intersection point with their pinion in an independent manner from each other. The capability of each rack to rotate on its axis, rolling longitudinally on its pinion, and thus changing its intersection point, opens a range of possibilities in the way the steering system can be managed to obtain various results. Amongst a wide range of possibilities in exploiting the steering systems two basic options may be most desirable in changing the Ackermann geometry and varying the steering ratio.

Figure 9:
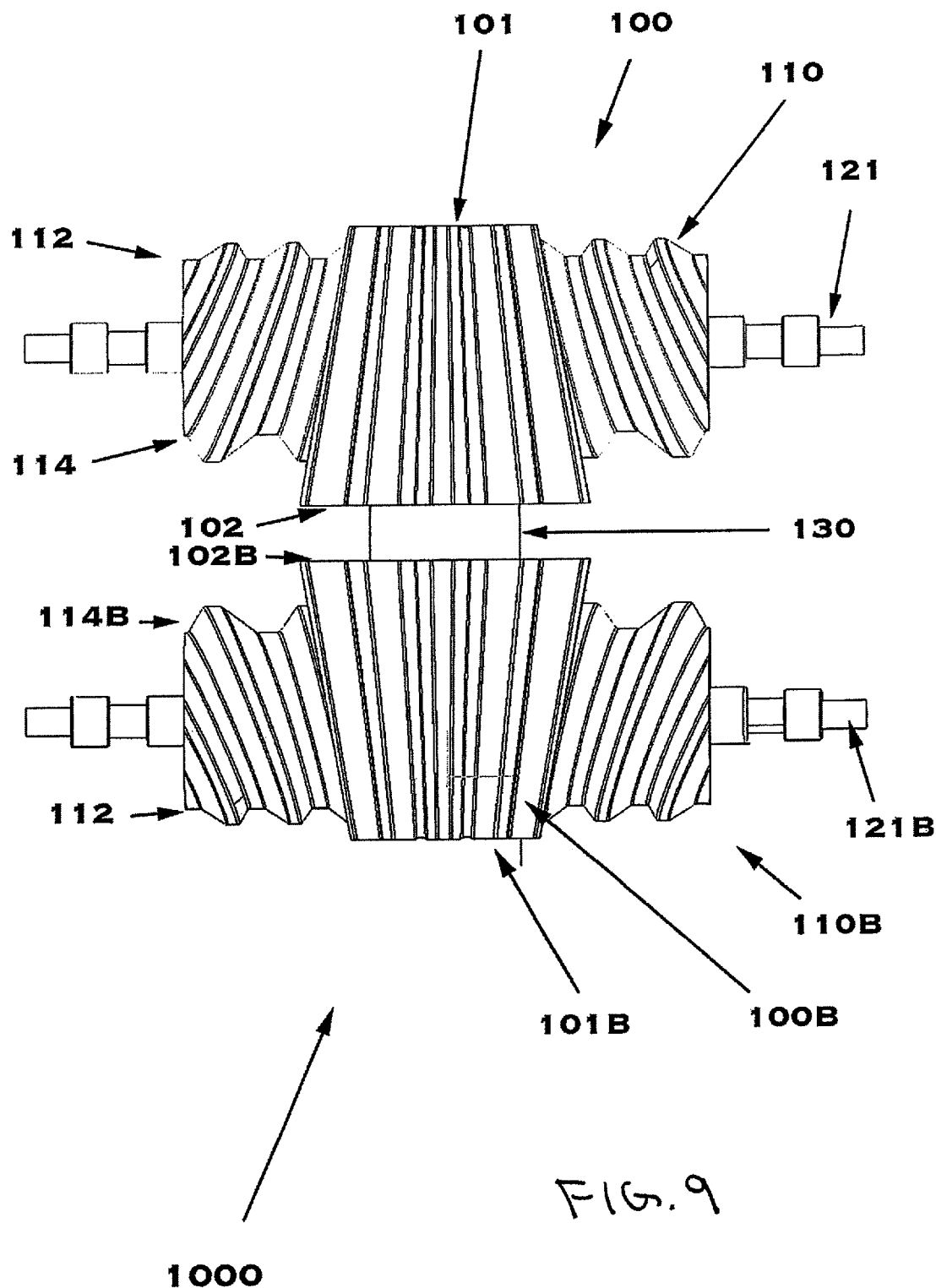
FIG. 9 is a top view of the steering system 1000.

In order to vary the Ackermann geometry, one example of setting up a management system which would give the driver a fixed steering ratio while being able to access multiple Ackermann geometry settings includes identifying a fixed plane, parallel to the conical pinion's base, and setting it as the neutral plane along which the rack and pinion will intersect each time the rack/pinion set operates on the wheel corresponding to the outside wheel of a corner. In turn, the other rack/pinion set, which operates for the specific corner on the inside wheel, will intersect along the plane chosen by the driver or the electronic system managing the Ackermann geometry settings, this by having its rack rotate on its axis and roll on its pinion to reach the desired intersection plane. While each rack can independently rotate on its axis and roll longitudinally on its respective pinion, the pinions are fixed to the steering column and turn with it in the same manner. This means that the two pinions can also be conceived to be a single pinion specially conceived to operate both racks. This particular embodiment is shown, for example, in FIG. 9 (which shows steering system 1000 of FIG. 5), where bases 102 and 102B are joined.

Going back to our Earth example, we will set the Greenwich meridian as the plane corresponding to the steering wheel of our vehicle set in the straight position, choose the tropic of cancer as our neutral plane, and tell our traveler to always walk along the tropic each time the Earth rotates to the east (in a system where we can customize the rotation of our planet) and to walk along the parallel of our choice each time the Earth rotates to the west. Then, at the same time, we add a symmetric Earth system and tell our traveler to inverse the direction given to his companion, meaning we tell him to always walk along the tropic when the Earth rotates to the west and to walk along the parallel of our choice each time the Earth rotates east. Both Earth systems—representing the two pinions in our system—are fixed to the same axis which runs through their poles. Therefore, both Earths rotate synchronously.

The management of the steering system outlined above would permit a driver to retain the same steering ratio established by the angle of the outside wheel being operated by the rack/pinion system with the rack always traveling along the neutral plane, this while the inside wheel turns at an angle within the range made available by the steering system and chosen by the driver—thus effectively changing the Ackermann geometry of the vehicle while the latter is in motion.

If the driver chose to have both racks operating along the neutral plane, the steering system would operate as a conventional steering system. In this scenario, both of our travelers would walk along the tropics regardless of the direction of rotation of their Earths. By establishing the neutral plane on a plane somewhere between the small and large bases of the conical pinion 100, the steering system retains the capability of changing the Ackermann geometry in both directions, which means increasing or decreasing the Ackermann at will; of course, the neutral plane can be set in correspondence of either base of the pinion in order to maximize the range of variable ratio in one direction at the expense of not being capable of changing it in the opposite one. So we would tell our traveler to position himself on the equator in order to have a higher level of change if we decided to have him walk on the arctic circle, so to be able to vary his walking distance more in spite of retaining the capability of shortening his walk but not lengthening it.

Those skilled in the art will appreciate that the disclosed steering systems may also be used to modify the ratio of the steering angle, which is the angle of the steering wheel in relation to the angle of the wheels on the ground, and accomplishing this while maintaining the same Ackermann geometry. By having both racks rotate simultaneously and identically between the bases of their conical pinions, the result will be a change in the radius of the corner at a constant steering wheel angle or, in other words, more or less steering wheel angle for the same wheel angle on the ground. This can be useful in situation like parking, when a higher ratio is needed. When driving at high speed, it may become more desirable to have less steering ratio, as at high speed small steering movements in a high ratio setting may make the steering too sensitive to the point of becoming dangerous.

Figure 10A:
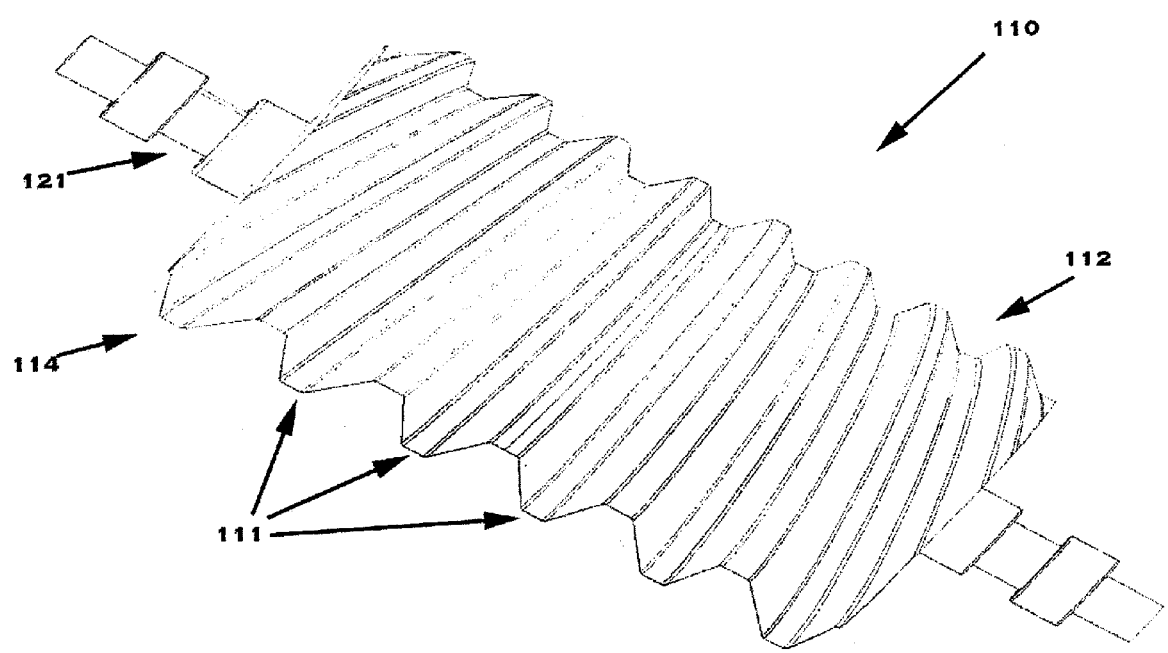
FIG. 10a shows a top view of rack 110.
Figure 10B:
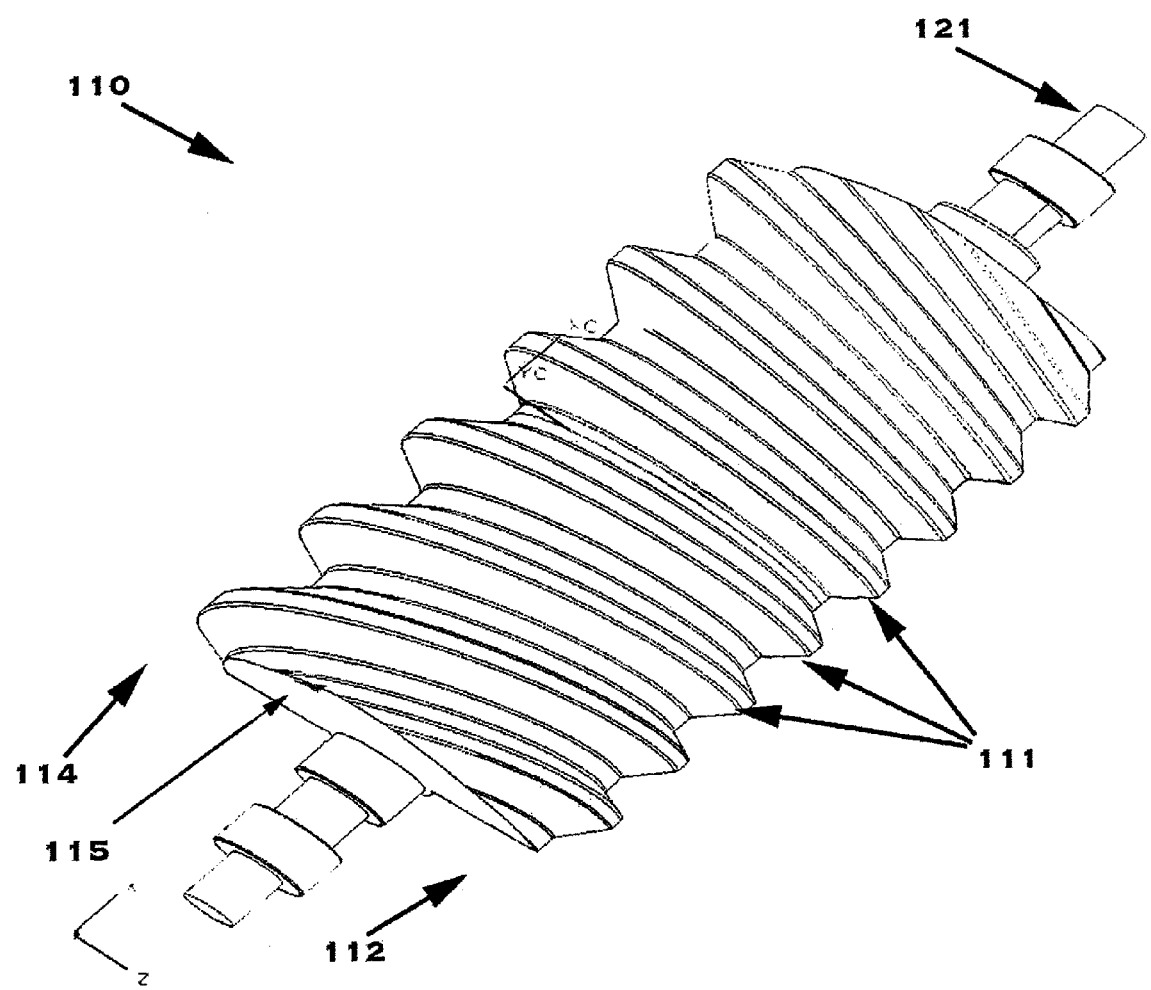
FIG. 10b features the same rack 110 from an alternative perspective.
Figure 10C:
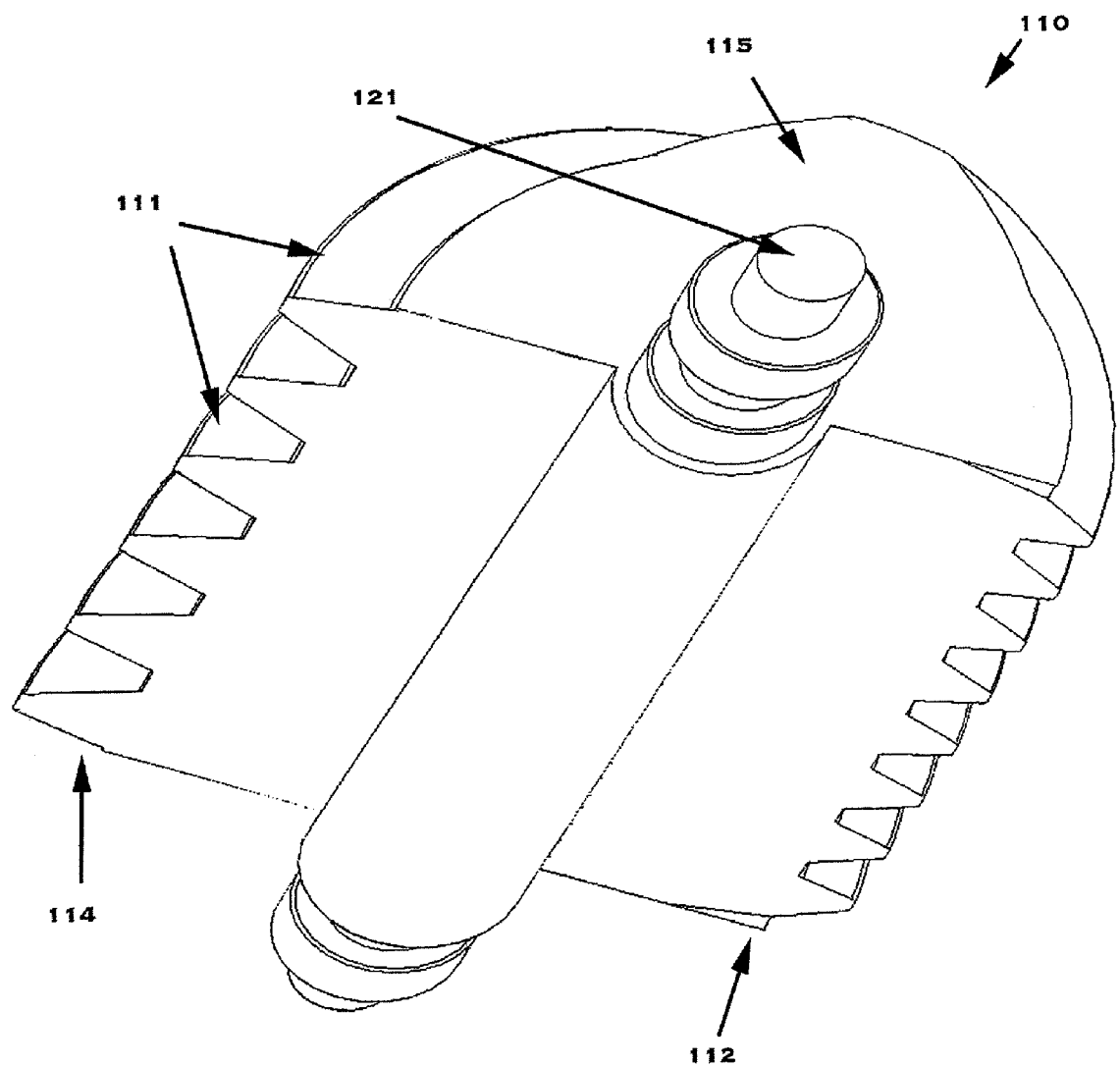
FIG. 10c is a view of rack 110 from an angle.

FIG. 10a shows a rack 110 for use in the steering system 1000. The rack 110 includes axis 121, teeth 111 which develop around the cylindrical body of rack 110 (flat here because the rack is viewed from the top). The teeth 111 increase in size as they move from rack 110's side 112 to rack 110's side 114. Sides 112 and 114 are to be considered as the two planes where all teeth begin and end respectively. FIG. 10b shows the rack 110 from a different perspective, where the cylindrical section 115 of rack 110 (on which surface teeth 111 run from side 112 to side 114) can be viewed. FIG. 10c sets forth the rack 110 at an angle showing the cylindrical section 115 of rack 110 on the curved surface of which teeth 111 develop from side 112 to side 114. This particular rack 110 has a cylindrical section 115 of 180° radius, forming a half cylinder the surface of which is exploited by teeth 111; the cylindrical section 115 can be designed to be less or more than 180° according to the specific application.

Figure 11:
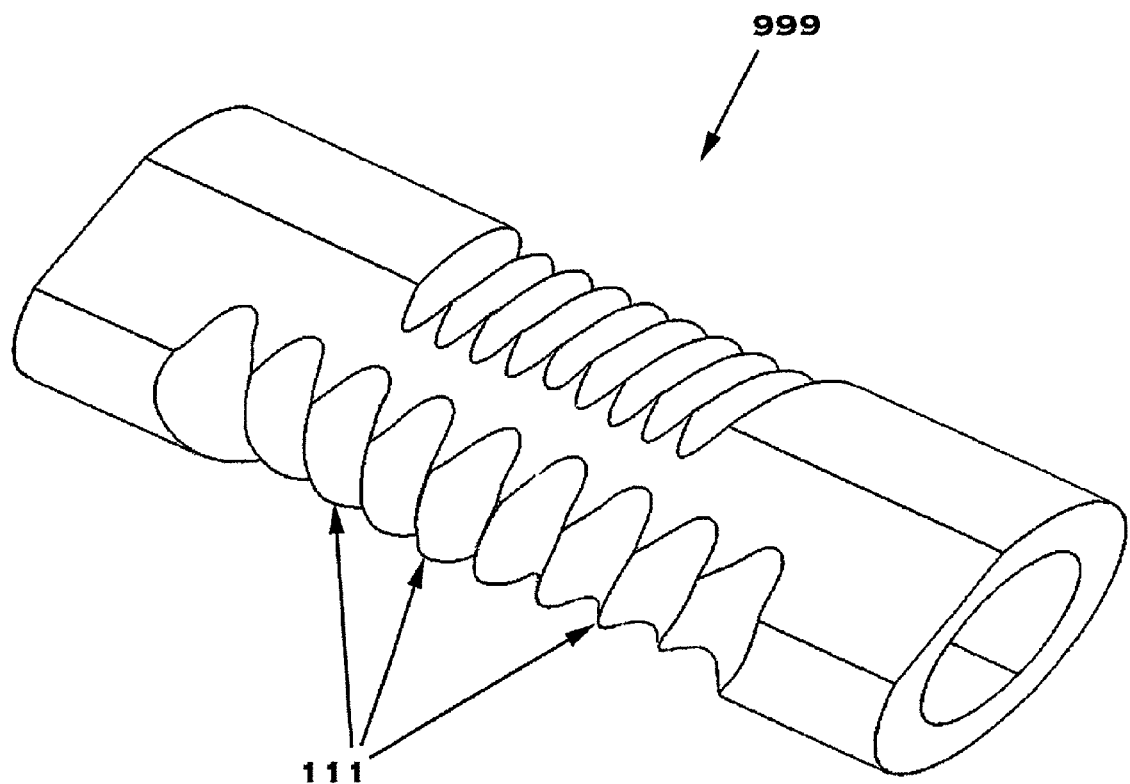
FIG. 11 shows rack 999.
Figure 17A:
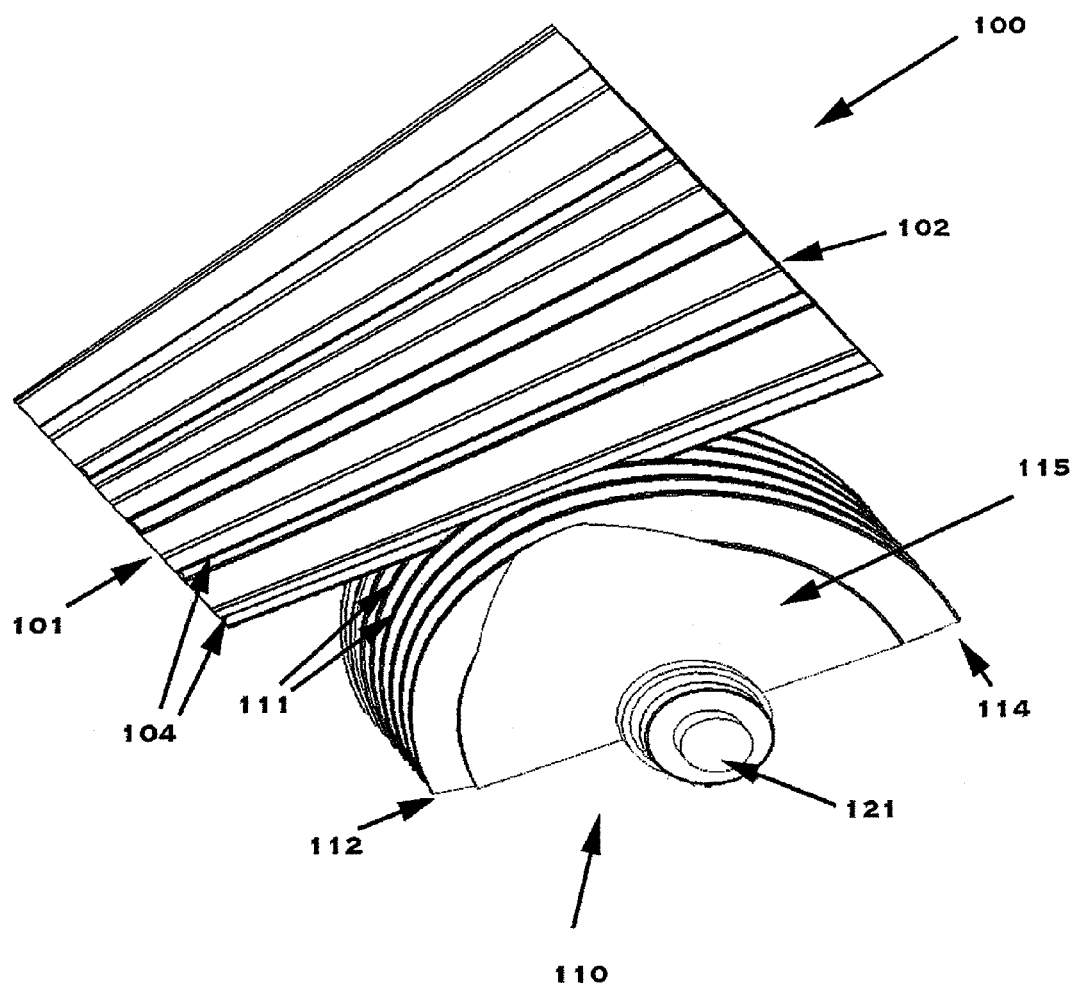
FIG. 17 shows pinion 100 and rack 110 intersecting.

FIG. 11 shows the rack 999 (previously described in relation to FIG. 8) with teeth 1111 developing over almost the entire 360° of the available cylindrical surface of rack 999.

Figure 12B:
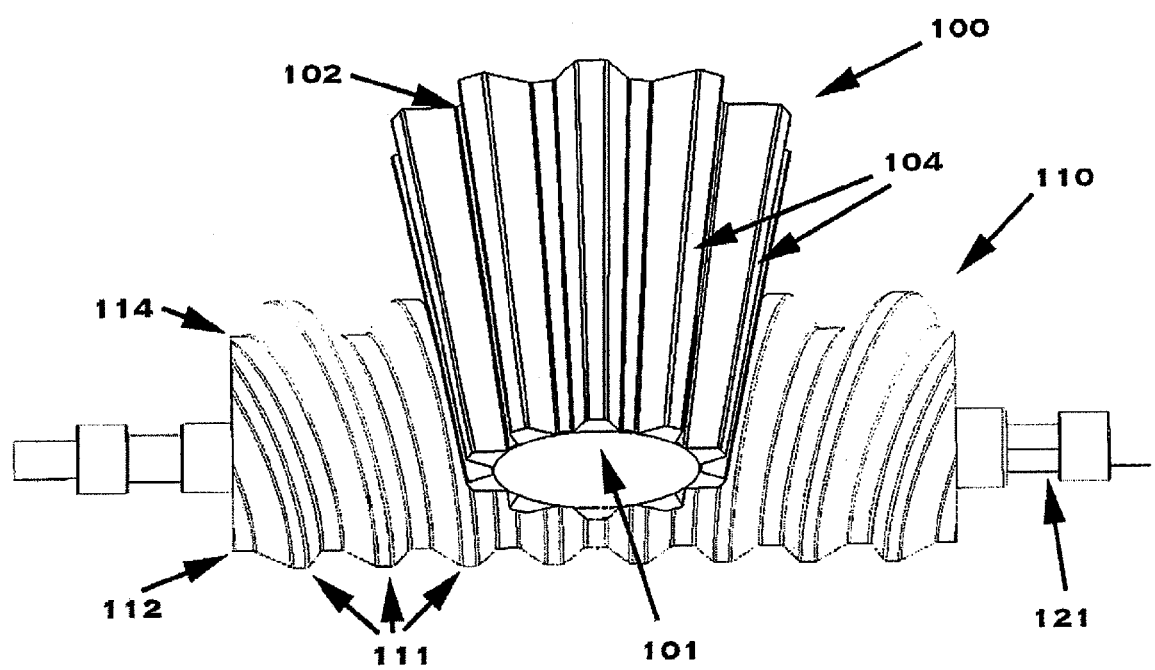
FIG. 12b is a front view of the interplay between pinion 100 and rack 110.
Figure 12C:
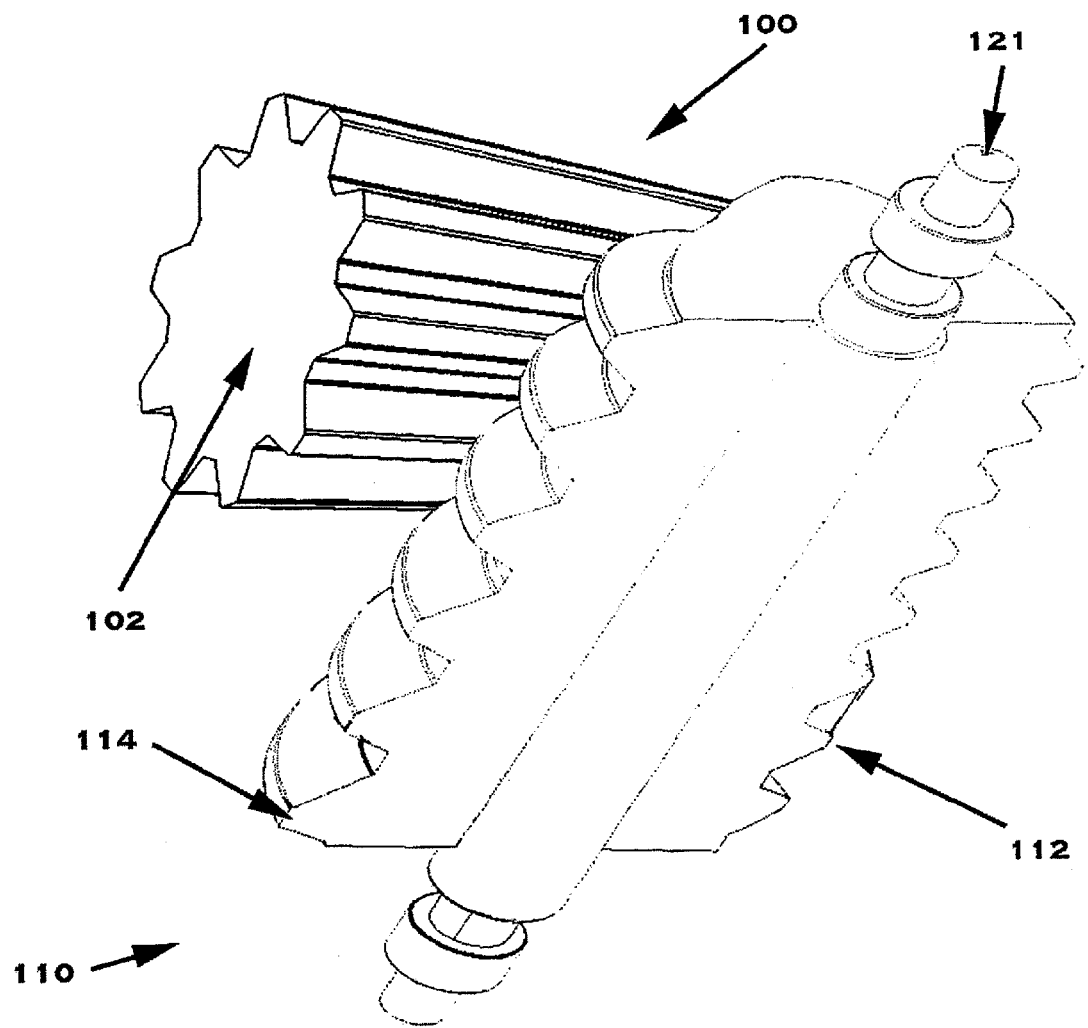
FIG. 12c is a view from a bottom perspective of the interplay between pinion 100 and rack 110.

FIGS. 12a through 12c show the interplay between conical pinion 100 having a small base 101 (here seen in profile), a large base 102 (here seen in profile), teeth 104, and rack 110 having axis 121 and teeth 111 developing on its curved surface 115 and stretching from side 112 to side 114. Teeth 104 increase their size as they develop from base 101 to base 102 of pinion 100 in the same manner as teeth 111 stretch from side 112 to side 114 of rack 110.

Figure 13A:
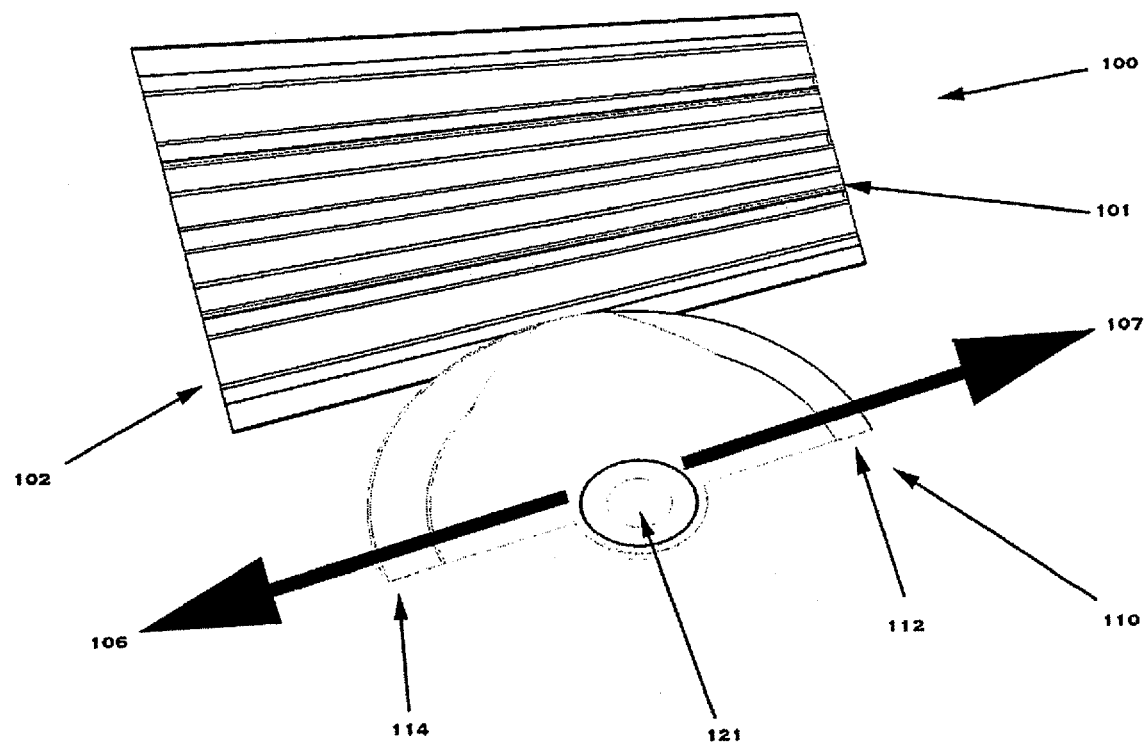
FIG. 13a shows the motion of rack 110.
Figure 13B:
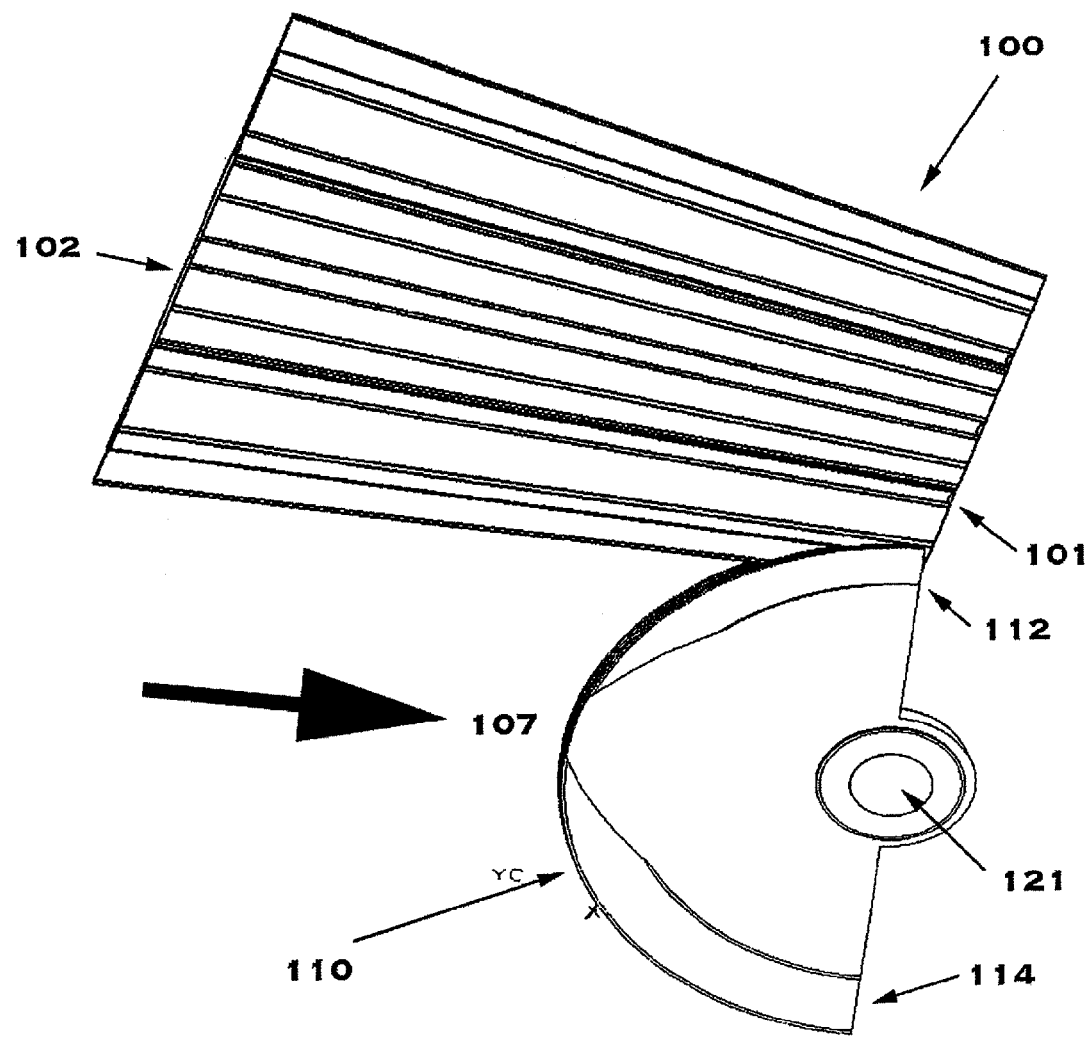
FIG. 13b is a view of pinion 100 and rack 110 intersecting.
Figure 13C:
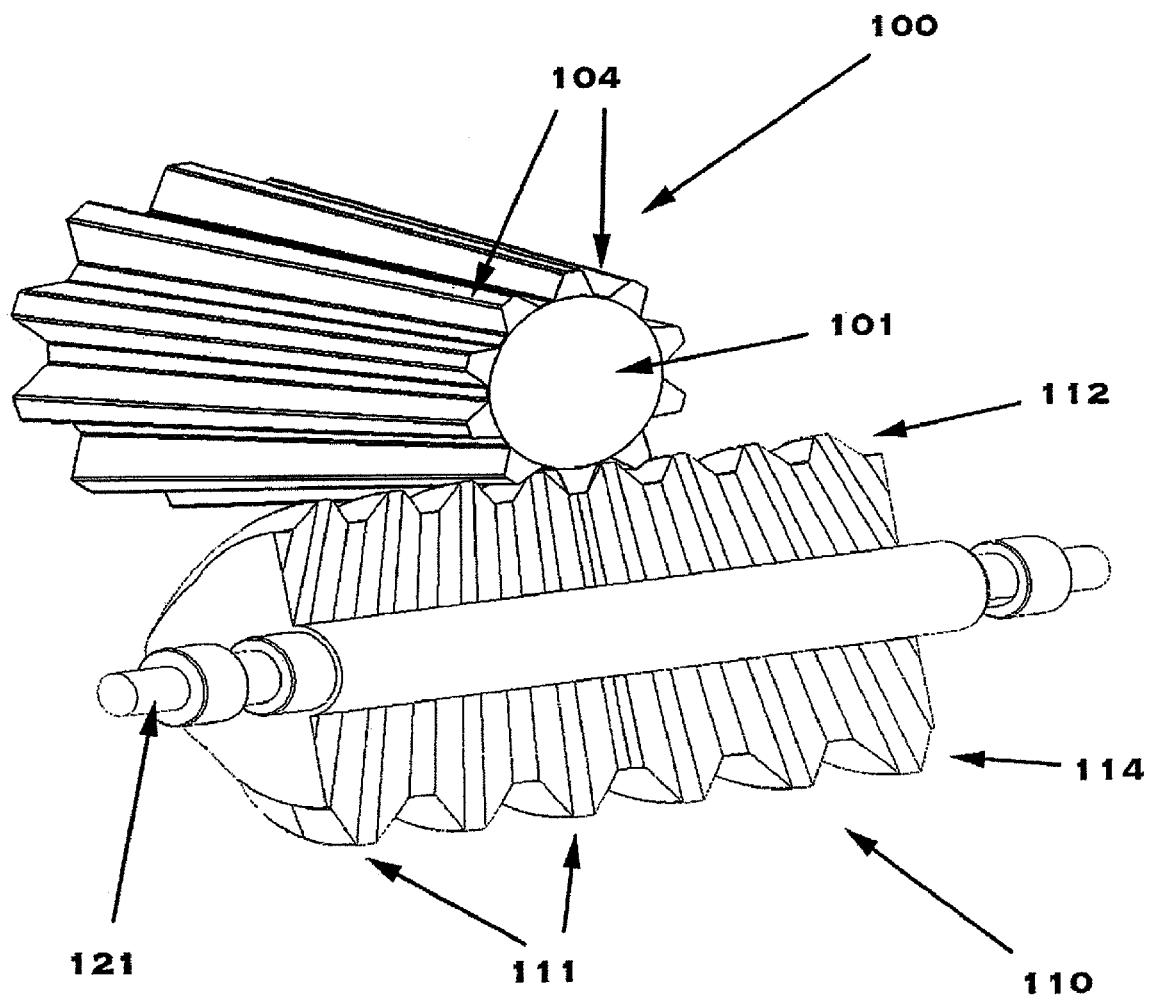
FIG. 13c is a front perspective of FIG. 13b.

FIG. 13a outlines the motion of rack 110 as it rotates on its axis 121, rolling in direction 107 as it rotates counterclockwise, in a way that rack 110's side 112 eventually intersects pinion 100 in proximity of pinion 100's small base 101 (here seen in profile). In the same way, as rack 110 rotates clockwise it can also roll in direction 106, causing its side 114 to progressively approach pinion 100's large base 102 (shown here in profile). FIGS. 13b and 13c show side 112 of rack 110 intersecting pinion 100 in proximity of pinion 100's small base 101 after having rotated counterclockwise on its axis 121 and moved in direction 107.

Figure 14A:
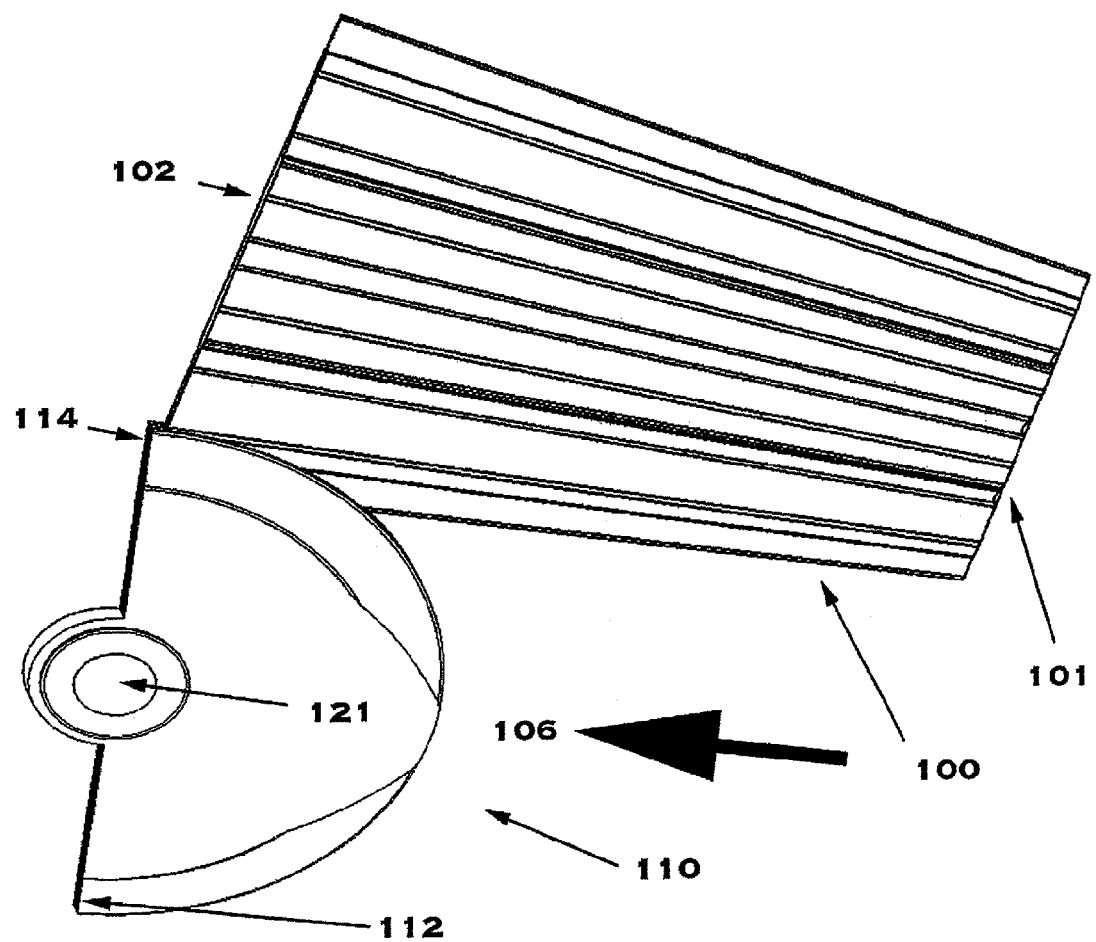
FIG. 14a shows the result of rack 110 rotation.
Figure 14B:
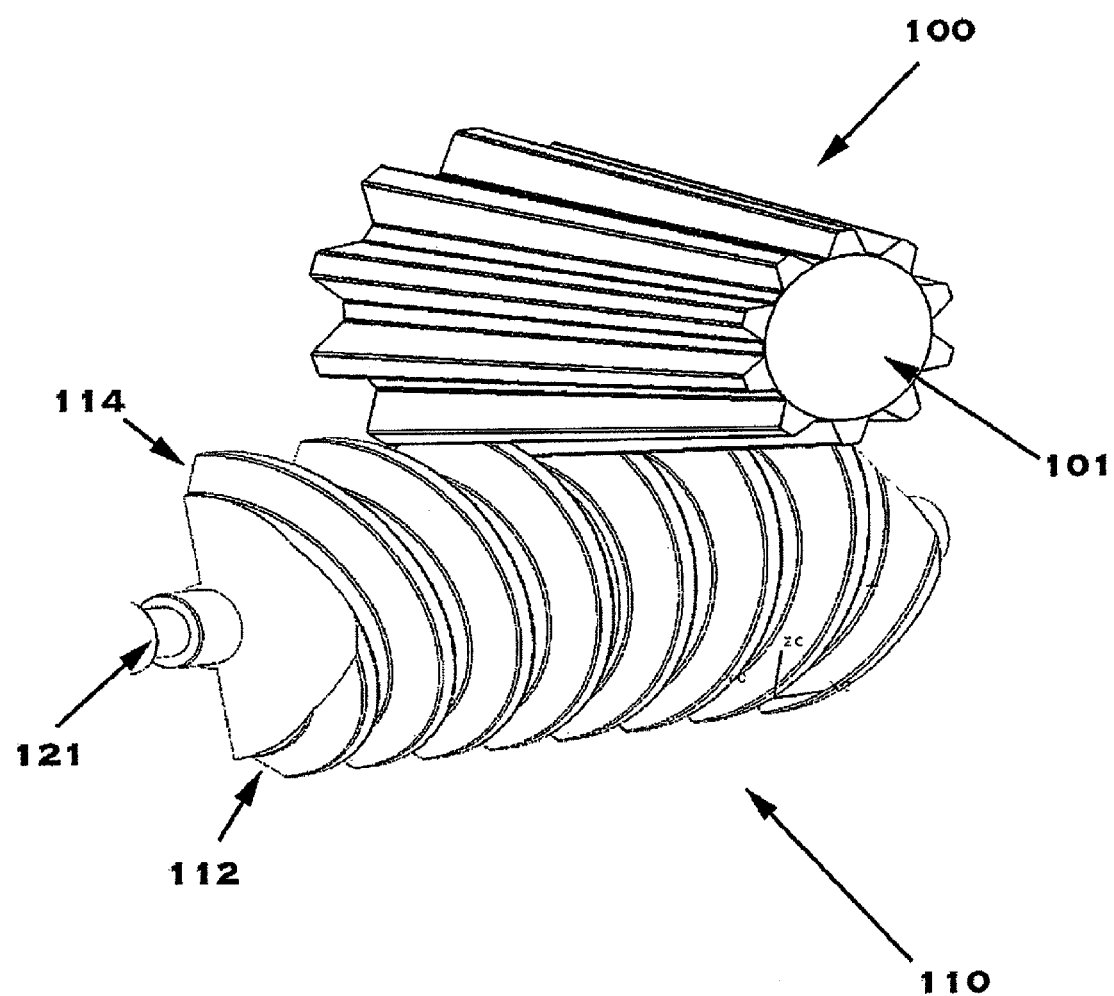

FIGS. 14a and 14b shows the result of rack 110 rotating clockwise on its axis 121 and moving in direction 106 to intersect pinion 100 in proximity of pinion 100's large base 102.

Figure 15:
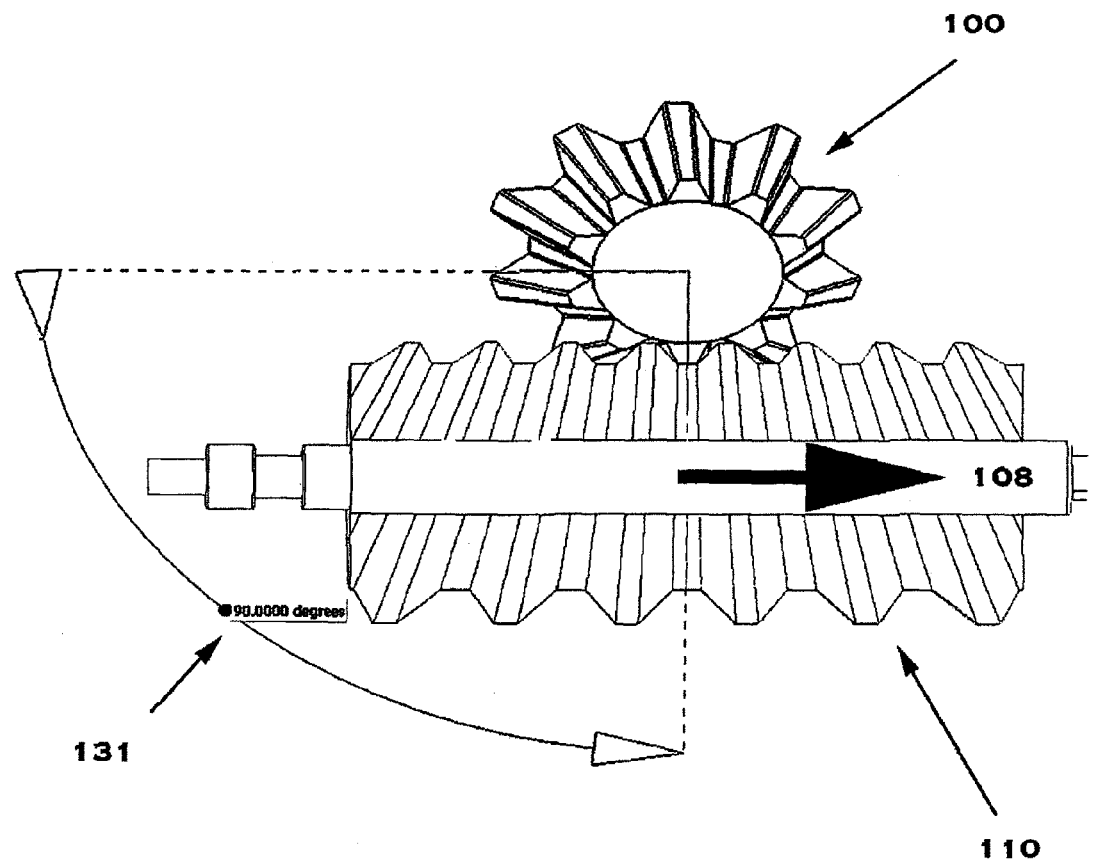
FIG. 15 shows pinion 110 about to make a 90° rotation.

FIG. 15 shows pinion 110 about to make a 90° counterclockwise rotation 131 as a result of the driver turning the steering wheel 90°, and the consequent motion of rack 110 in direction 108.

Figure 16:
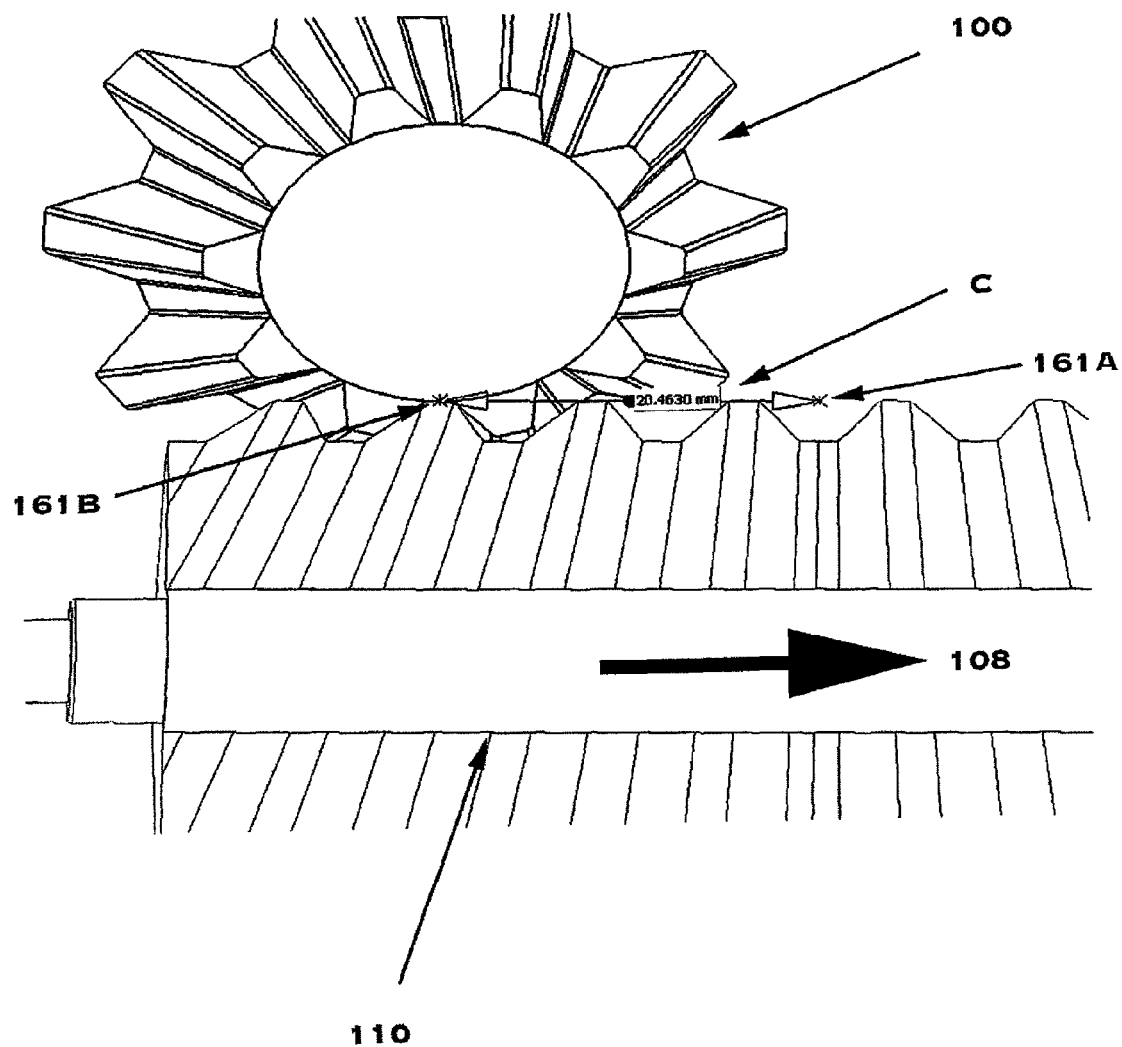
FIG. 16 shows a detail of the position of pinion 100 after rotation.

FIG. 16 shows a detail of the position of pinion 100 after rotation causing lateral motion 108 of rack 110 in the measure of distance C, which is calculated from the center 161A of rack 110 (a point which represents the original intersection point between pinion 100 and rack 110 before rotation) and point 161 B (which is the intersection point between rack 110 and pinion 100 after the 90° rotation of pinion 100 and consequent motion 108 of rack 110).

Figure 17:
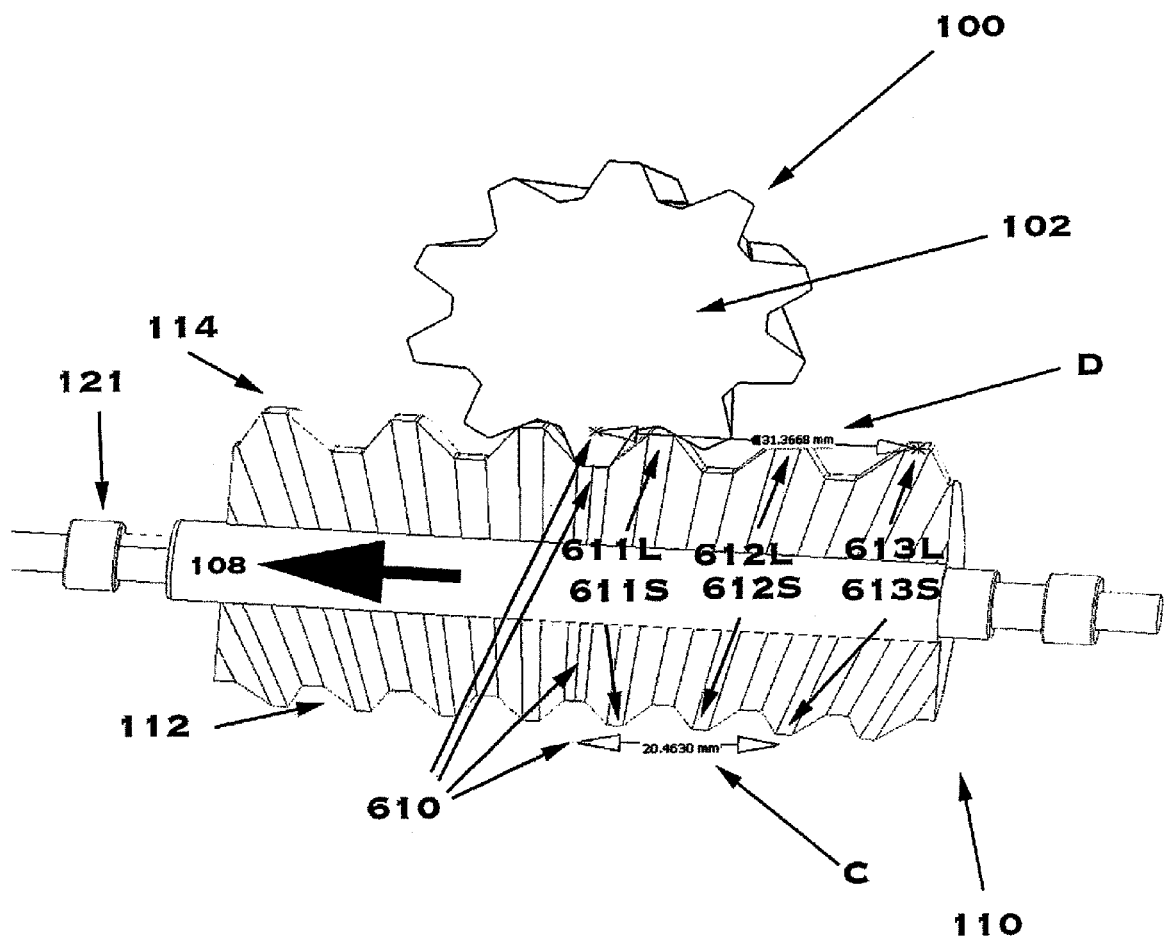

FIG. 17 outlines the intersection of pinion 100 and rack 110 in proximity of pinion 100's large base 102 and rack 110's side 114. FIG. 17 also shows the projected distances resulting from a 90° clock-wise rotation of pinion 100 (the same rotation as in FIG. 15 and FIG. 16 but seen from the back); the 90° clock-wise rotation of pinion 100 will correspond to a motion 108 of rack 110 equal to distance D when pinion 100 and rack 110 intersect in correspondence of pinion 100's base 102 and rack 110's side 114 (as shown) and, in turn, the same rotation will correspond to a motion 108 of rack 110 equal to distance C when pinion 100 and rack 110 intersect in correspondence of pinion 100's small base 101 (shown here on the opposite side of base 102 and therefore hidden) and rack 110's side 112. The distances C and D correspond to the motion 108 of rack 110 having moved along three teeth of rack 110 from rack 110's center 610, and respectively teeth 611S, 612S and 613S for distance C and teeth 611L, 612L and 613L for distance D. As a consequence, for the same steering angle, rack 110 will move a distance comprised between the length of distance C and the length of distance D according to the intersection point between rack 110 and pinion 100, intersection which is comprised between base 101 and base 102 of pinion 100 intersecting rack 110 between sides 112 and 114 accordingly. It must also be noted that any rotation of rack 110 around its axis 121 and consequent roll of rack 110 along pinion 100 does not produce any lateral motion for rack 110 when the steering wheel is straight.

Figure 18:
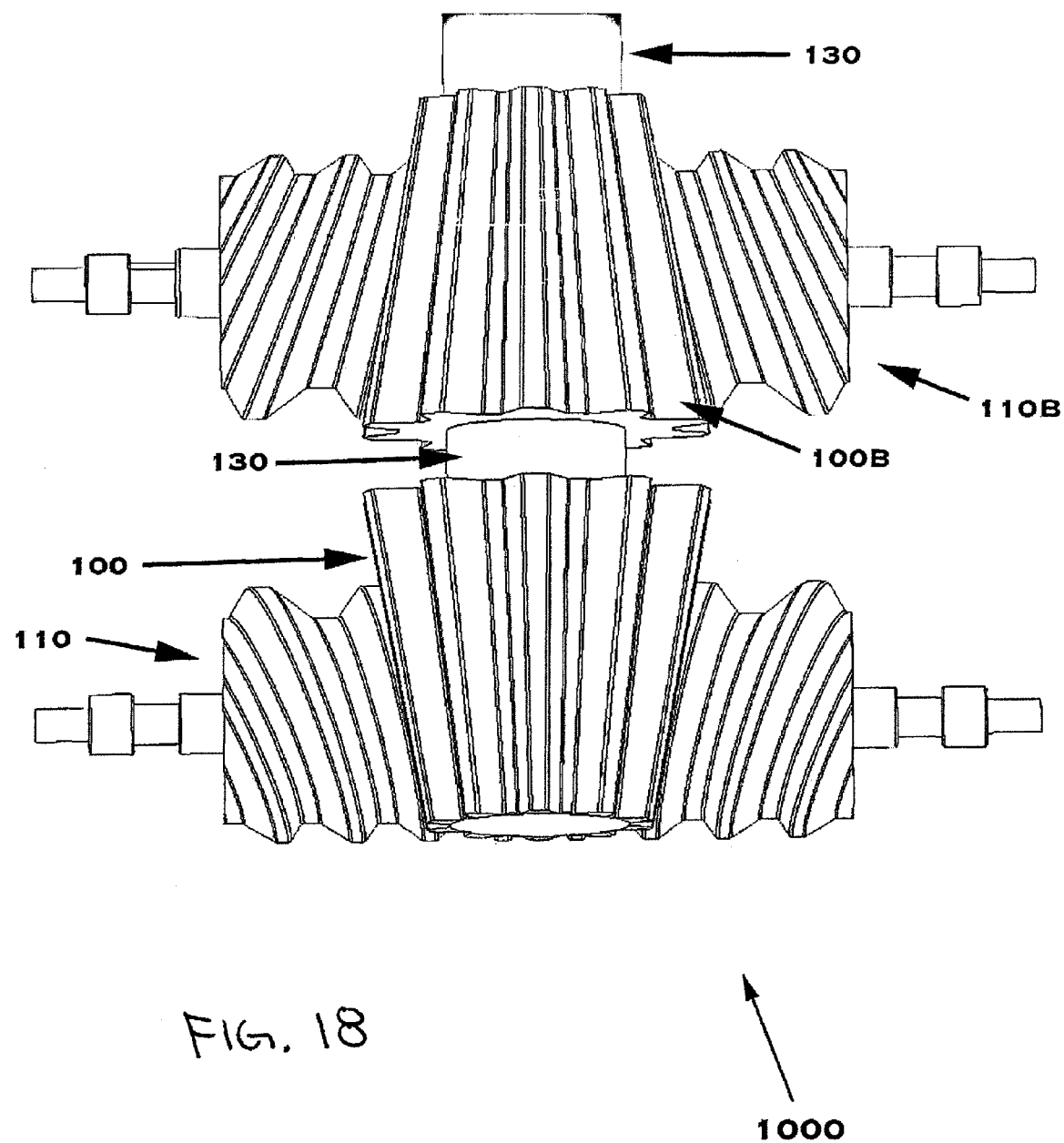
FIG. 18 shows steering system 1000.
Figure 19:
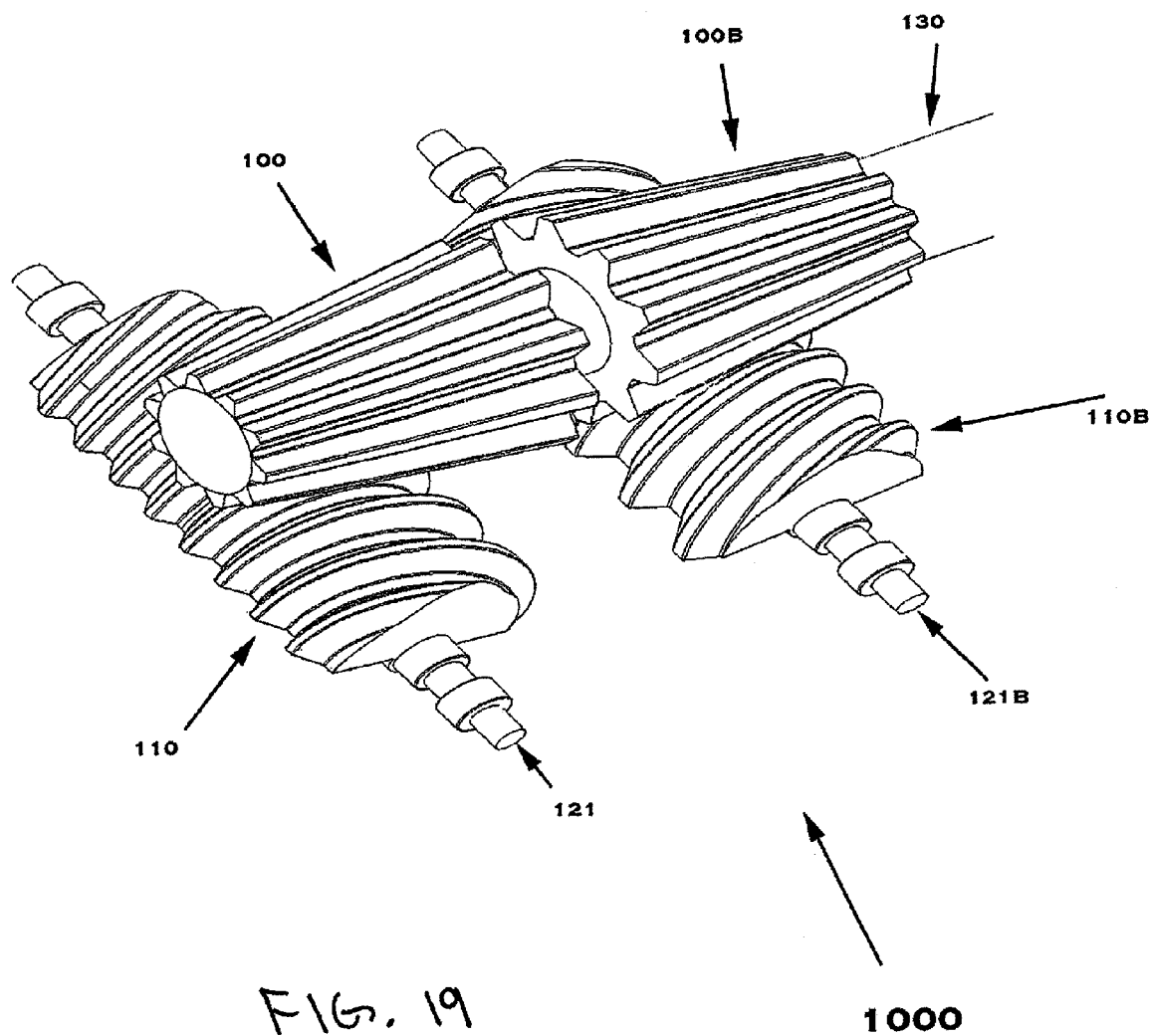
FIG. 19 is a perspective view of steering system 1000.

FIGS. 18 and 19 show the steering system 1000 with pinion 100 and 100B fixed on steering column 130 in a symmetric position, and intersecting racks 110 and 110B respectively, which are symmetrically positioned as a consequence of the back to back positioning of pinions 100 and 100B.

Figure 20:
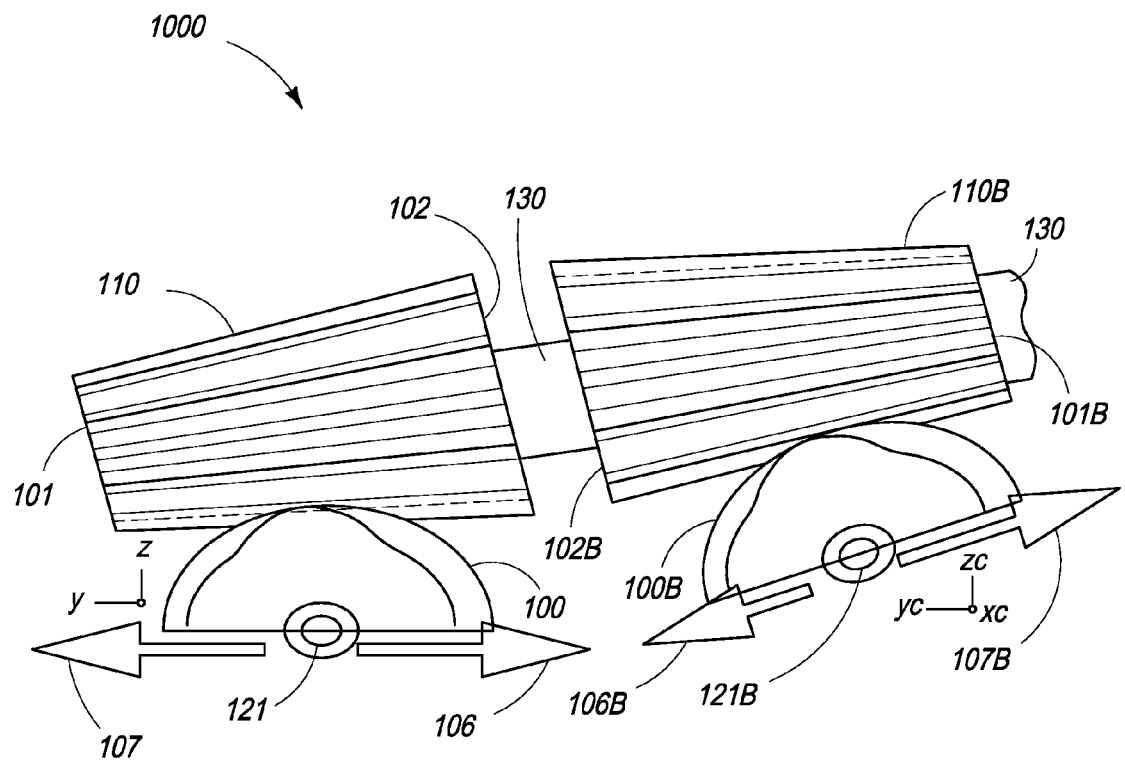
FIG. 20 is a profile view of steering system 1000.

FIG. 20 shows steering system 1000 and illustrates possible motion of rack 110 which, when rotating in a counterclockwise direction, moves in direction 106 to intersect pinion 100 closer to base 102, and when rotating clockwise rack 110 moves in direction 107 for an intersection with pinion 100 in correspondence of base 101. The same is true for rack 110B, which rotates clockwise and moves in direction 106B to intersect pinion 100B in proximity of base 102B or counterclockwise, moving in direction 107B to intersect pinion 100B in proximity of base 101 B. Racks 110 and 110B can move independently or synchronously, depending on the desired variation of Ackermann geometry and/or steering angle.

Figure 21:
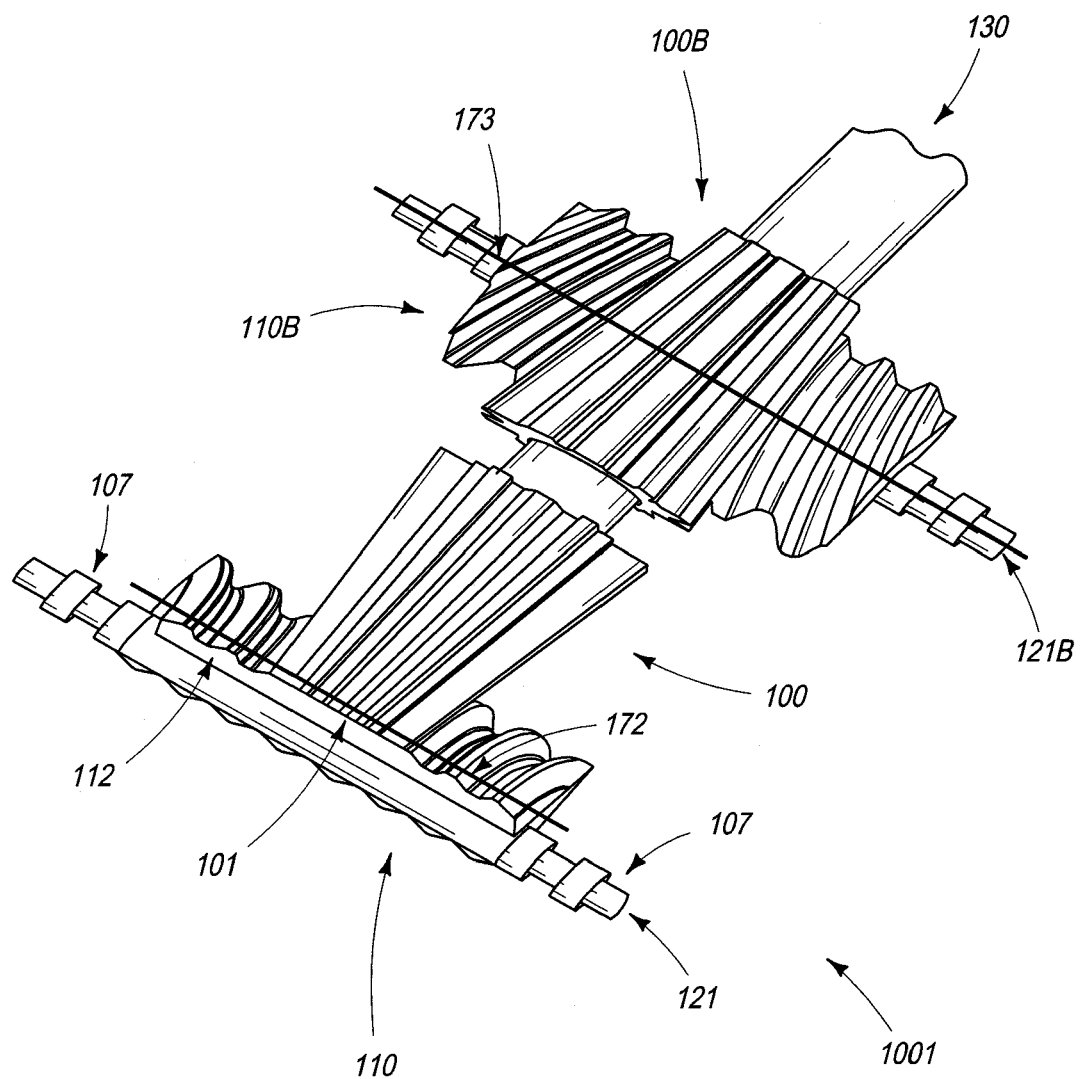
FIG. 21 shows steering system 1001 featuring pinion 100 and rack 110 which meet along intersecting plane 172.
Figure 22:
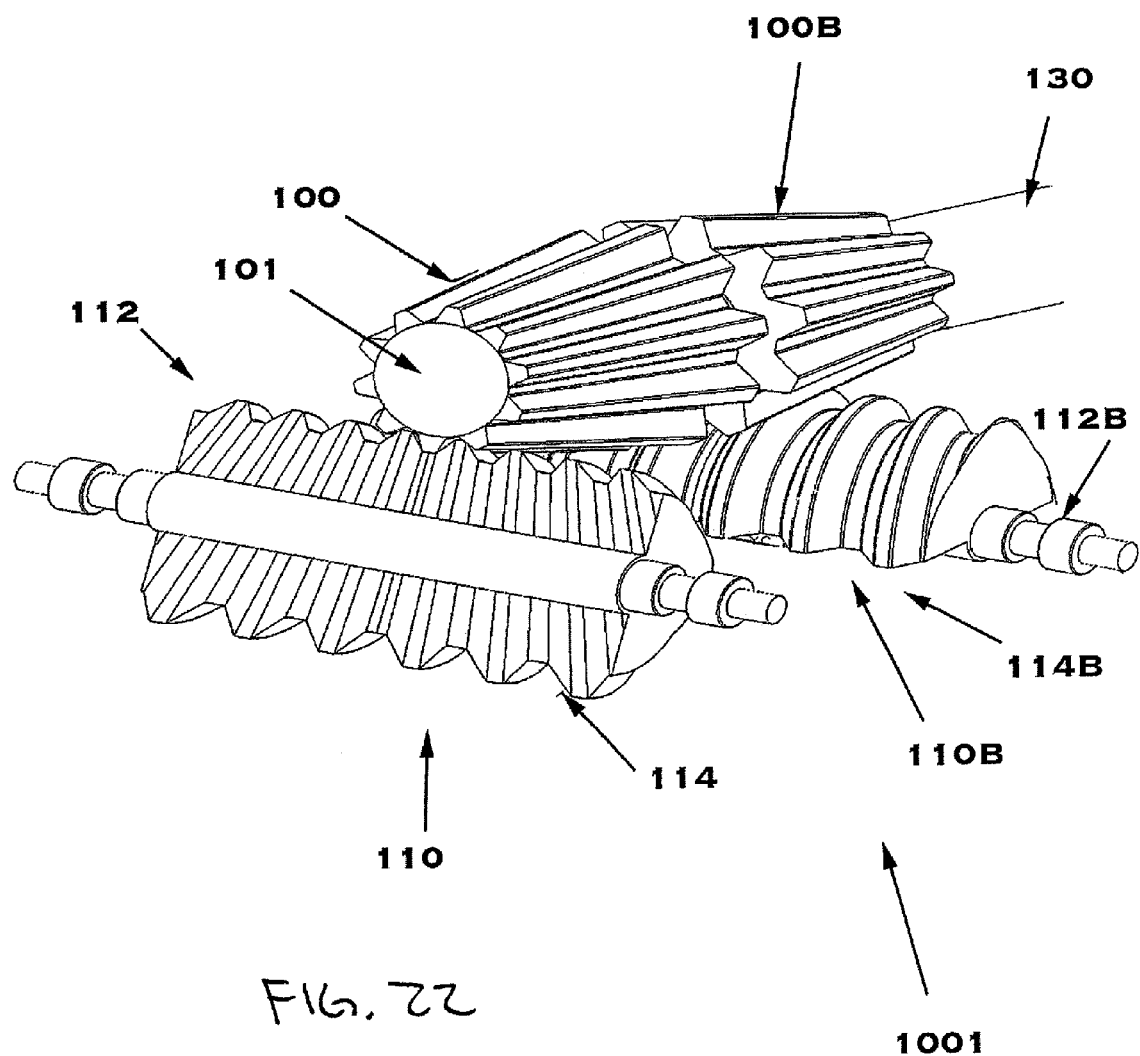
FIG. 22 is a view of system 1001 from a front perspective.
Figure 23:
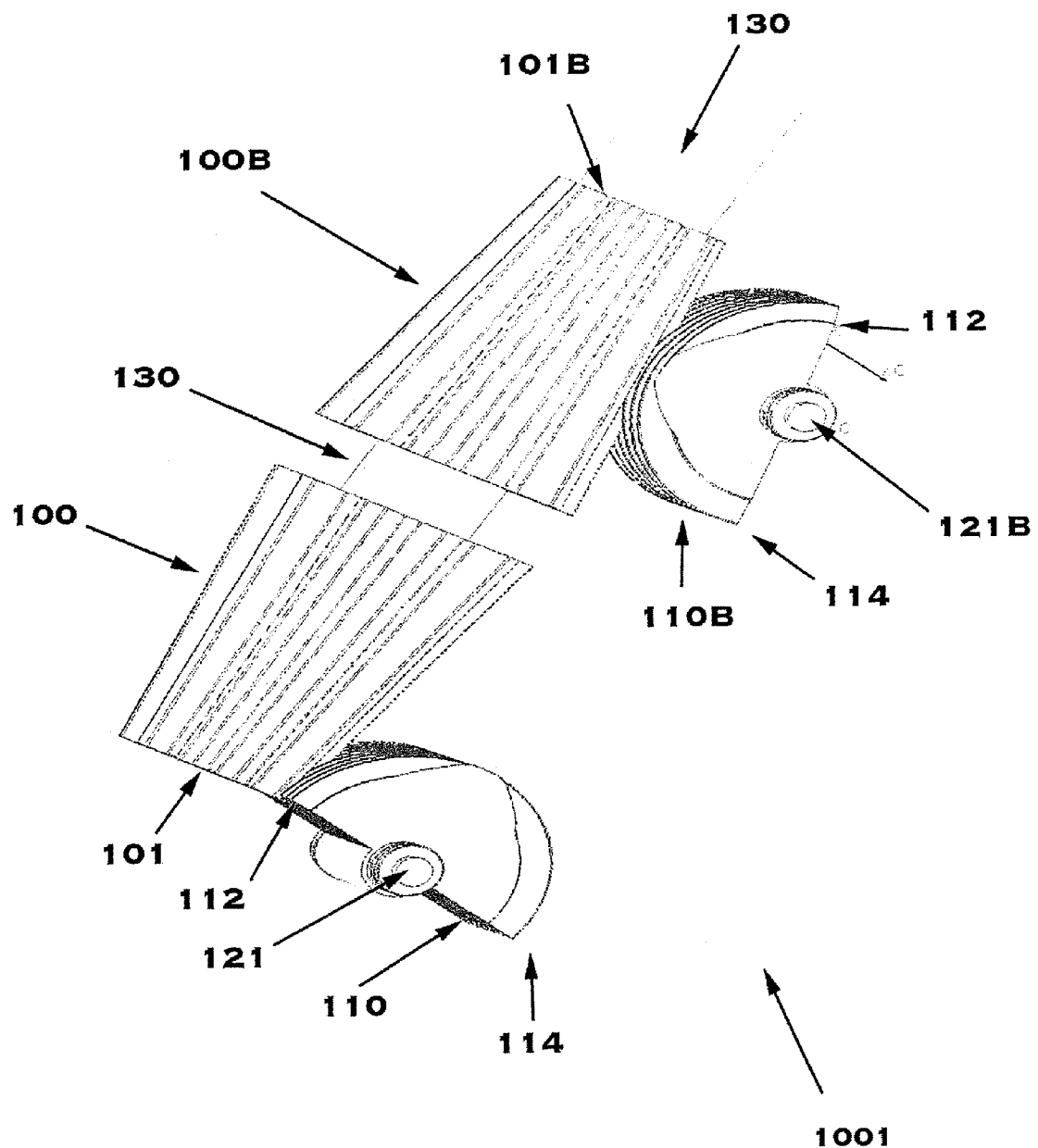
FIG. 23 is a profile view of system 1001.

FIGS. 21 through 23 show a steering system 1001 featuring pinion 100 and rack 110 which meet along intersecting plane 172, region which represents the line of intersection between pinion 100 and rack 110 at the turning of the steering wheel (and pinions 100-100B as a consequence; steering wheel not shown here), after rack 110 has moved in direction 107 to intersect pinion 100 in proximity of base 101; pinion 100B, in turn, and rack 110B intersect along plane 173 as pinion 100B rotates in either direction. In this setting rack 110 will move a shorter distance than rack 110B for the same steering angles. Plane 173 can be set to be a neutral intersecting plane corresponding to and performing like a rack of a standard steering system, set to be the plane along which the rack/pinion set corresponding to the outside wheel of a turn always intersected; in this case the rapport between the steering wheel rotation and the angle of the outside wheel remains constant. In this scenario, the rotation of the rack corresponding to the inside wheel in a turn, and the consequent intersection between the rack and the pinion along a plane different than the neutral plane 173 would change the turning angle of the inside wheel, thus producing multiple degrees of Ackermann geometry change.

Figure 24:
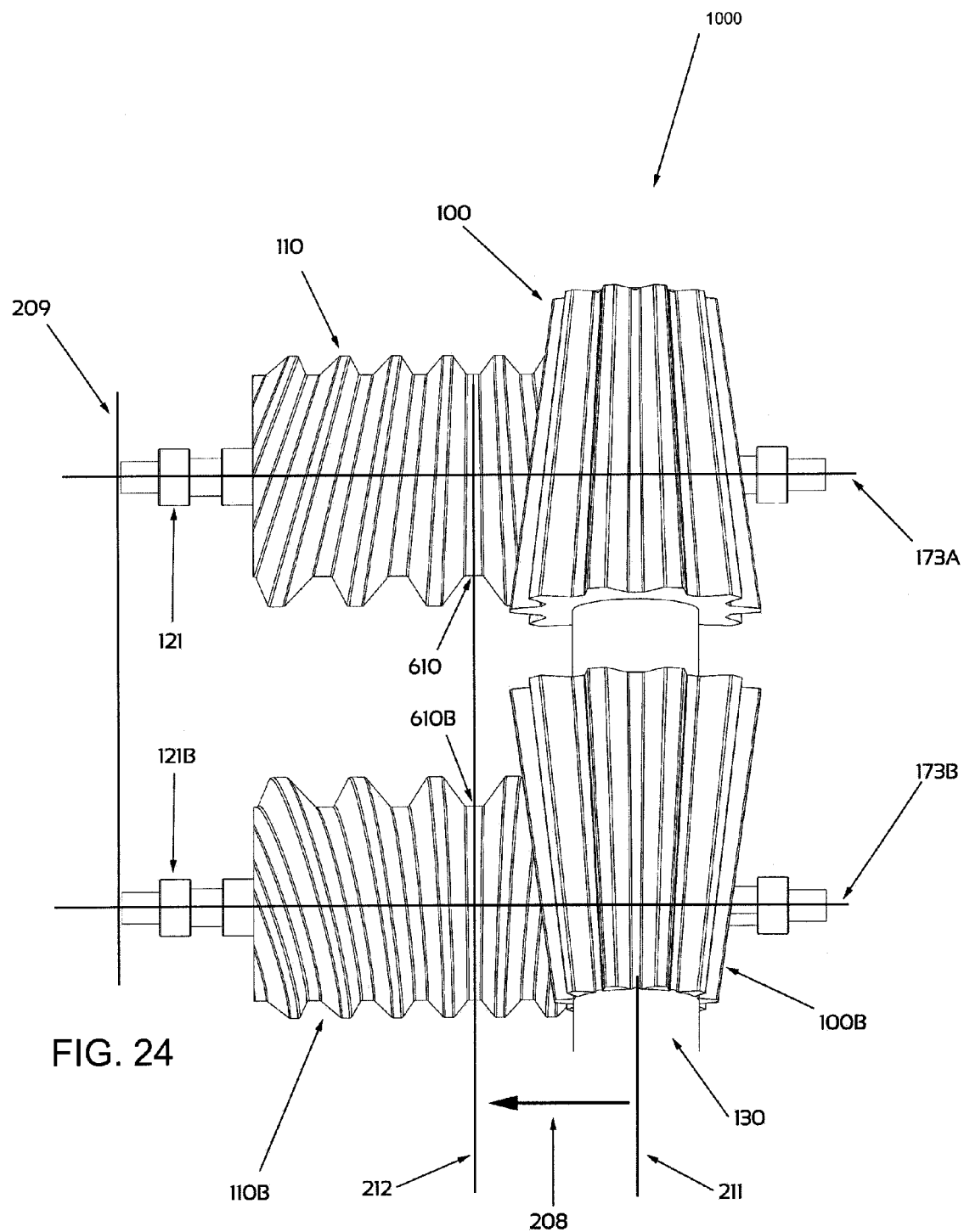
FIG. 24 shows steering system 1000 after a 90° rotation of steering column 130.

FIG. 24 shows steering system 1000 after a 90° rotation of steering column 130, which causes racks 110 and 110B to move in direction 208 the distance between plane 211, which represents the plane where rack centers 610 and 610B were positioned before the steering column 130 proceeded to rotate, and plane 212 which is the plane along which rack centers 610 and 610B dwell after the rotation of steering column 130. FIG. 24 also shows that because neither rack 110 nor rack 110B have operated any rotation on their respective axis 121 and 121B, in their lateral motion 208 they intersect their respective pinions 100 and 100B along neutral planes 173A and 173B respectively, along which the distance traveled by both racks is the same, represented by plane 209 as the common arrival point of both racks after the rotation of steering column 130.

Figure 25:
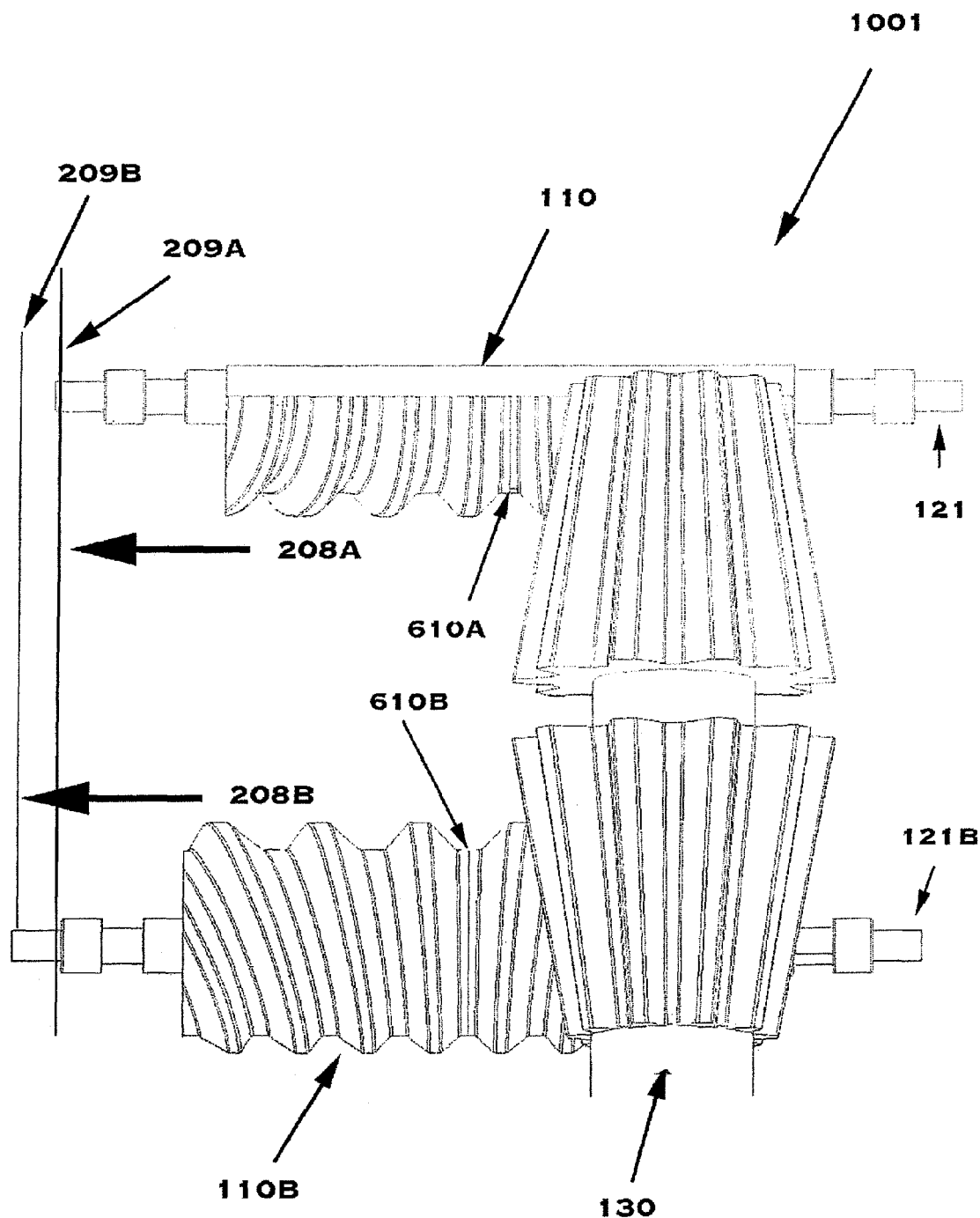
FIG. 25 shows a detail of system 1001 after steering column 130 has produced a rotation.

FIG. 25 shows a detail of system 1001 after steering column 130 has produced a rotation, where it can be appreciated that while pinions 100 and 100B are fixed to steering column 130 and therefore always in line with each other, rack 110 moves distance 208A to plane 209A, whereas rack 110B moves a greater distance 208B to plane 209B—it must be borne in mind that in this particular system when the steering wheel is straight, both pinions 100 and 100B intersect their respective racks at the racks respective centers 610A and 610B regardless of any rack rotation around their axis 121 and 121B.

Figure 26:
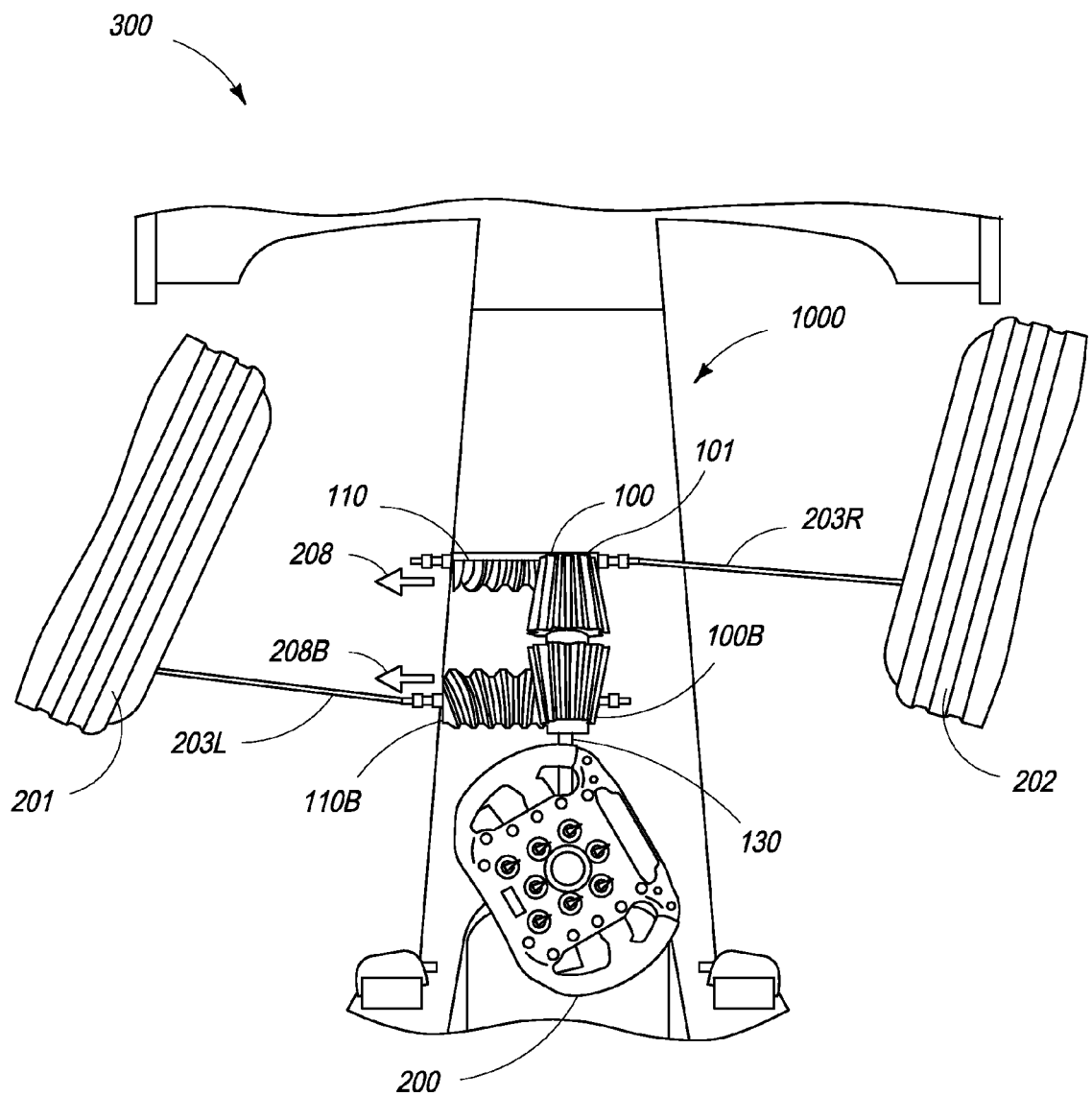
FIG. 26 shows steering system 1001 operating a right turn for vehicle 300.

FIG. 26 shows steering system 1001 operating a right turn for vehicle 300 in a setting where rack 110 has rotated on its axis 121 to move in direction 107 so to intersect pinion 100 in proximity of small base 101, whereas rack 110B remains in a neutral position without having operated any rotation on its axis nor any movement towards any one base of pinion 100B. The turning of steering wheel 200 produces the rotation of steering column 130 and, in turn, of pinions 100B and 100, rotation for which the angle is the same for all elements involved. This rotation triggers the motion of racks 110 and 110B in direction 208 and 208B; rack 110's motion 208 pulls steering arm 203R which steers tire 202 to the right, whereas rack 110B's motion 208B pushes steering arm 203L which steers wheel 201 to the right. In this case the turning of steering wheel 200 causes rack 110 to move a shorter distance 208 than the distance 208B traveled by rack 110B, thus inducing in this specific case a negative Ackermann (i.e., a relative wheel-converging when looked at from the front of the vehicle) in relation to a neutral setting.

Figure 27:
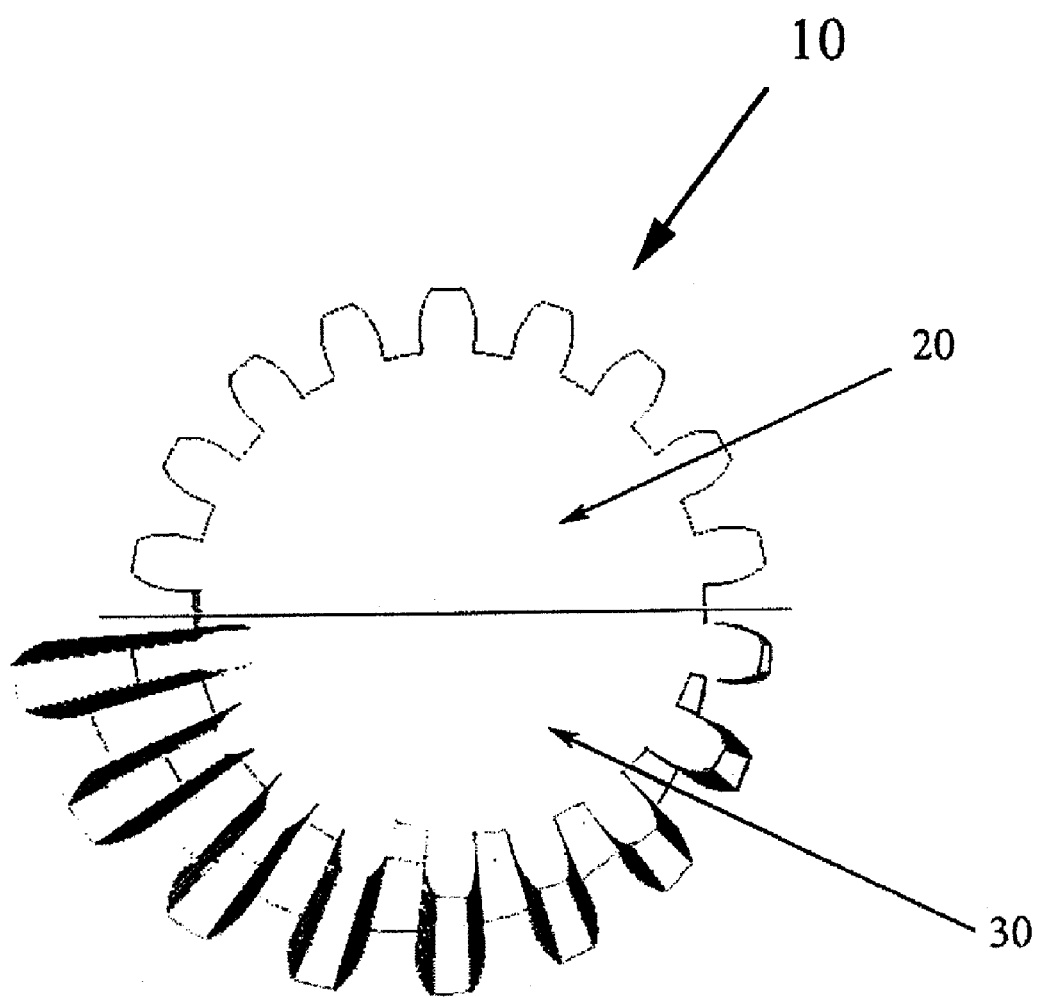
FIG. 27 shows pinion 10 featuring two sections.
Figure 28:
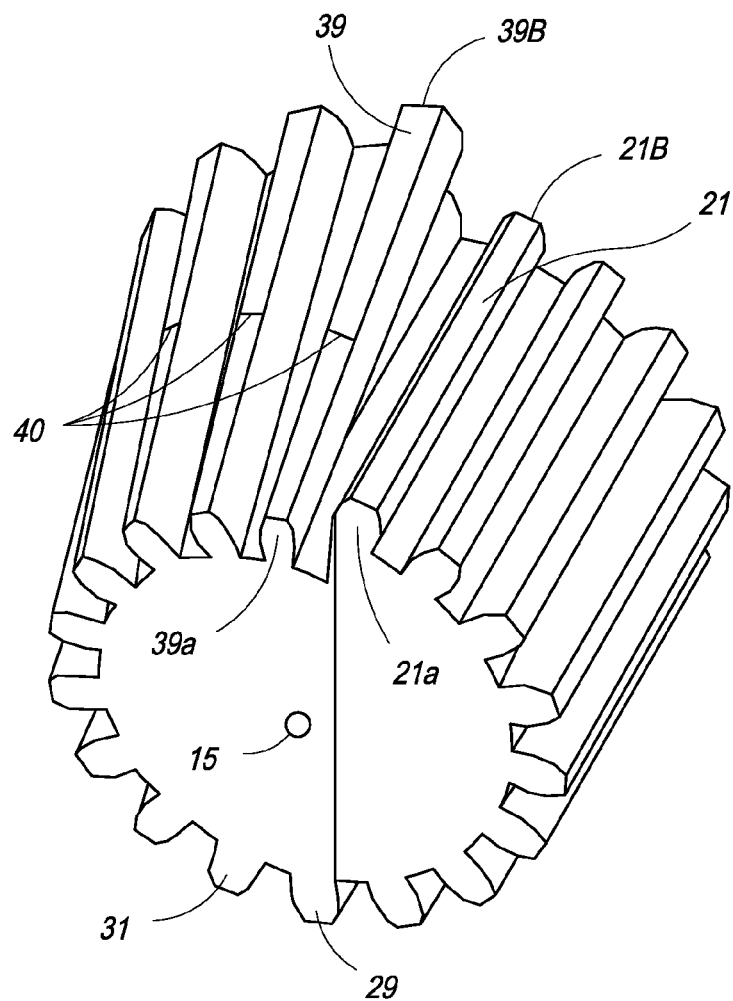
FIG. 28 shows pinion 10 from a perspective.

FIGS. 27 and 28 show an alternate pinion 10 having a fixed ratio half 20 and a variable Ackermann geometry half 30; the pinion 10 is viewed here from the top. Pinion 10 is capable of both reducing and augmenting the variable ratio in relation to a fixed parameter, as discussed above. Other pinions may be designed to accomplish only one of the two functions. Teeth 21 to 29 of pinion 10 form the fixed ratio half of the pinion, whereas teeth 31 to 39 form its variable ratio half. It can also be appreciated that each fixed ratio tooth presents the same dimensions on both sides 21A and 21B; the teeth from 31 to 39 present a different dimension and distance from the center 15 of pinion 10, as is the case between face 39A and face 39B of tooth 39. Points 40 represent the points on the variable ratio half of pinion 10 where teeth 31 to 39 have the same dimensions as teeth 21 to 29. Therefore, along the line formed by points 40 the ratio of all teeth on the pinion is the same. If we cut pinion 10 along points 40 into two pinions, we would have the pinion created between the points 40 and face A only capable of reducing the variable ratio whereas the pinion created between points 40 and face B only able of augmenting it.

Figure 29:
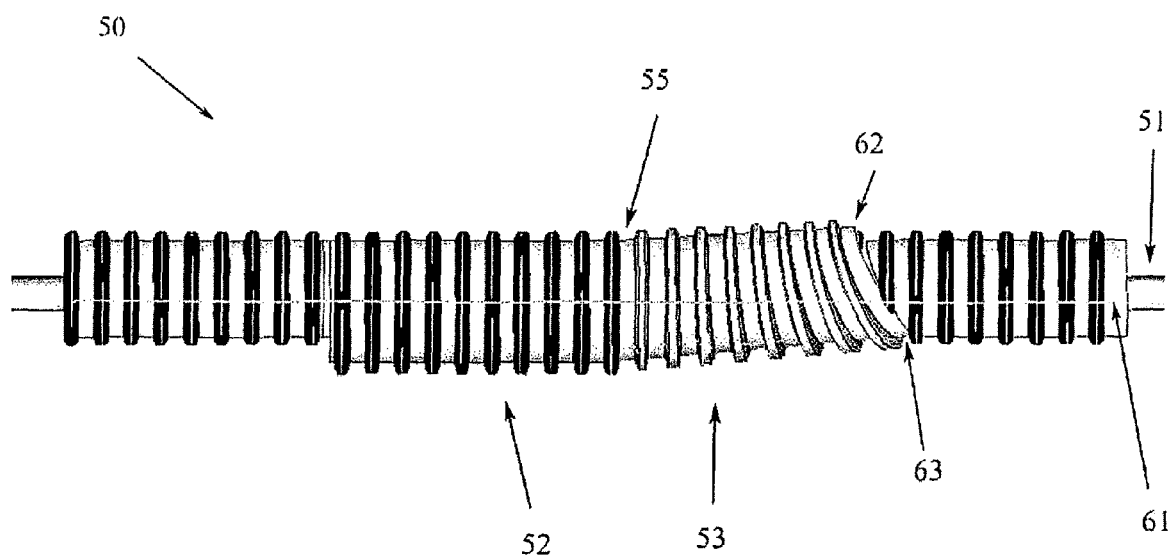
FIG. 29 is a view of rack 50.

FIG. 29 shows a rack 50 for use in the disclosed steering systems. The rack 50 is built on axle 51 and features a middle point 55 dividing it in two halves 52 and 53, where the former is a fixed ratio half and the latter a variable ratio one. Line 61 is the line crossing both halves where the distance between each tooth is the same and also the distance between each tooth and axle 51 is also the same. Point 62 is the ending point of the variable ratio half at its lowest ratio setting, while point 63 is the ending point of the variable ratio half at its highest ratio setting. Rack 50 turns on its axle 51 and moves, at the same time, longitudinally between the two faces of the pinion, and by so doing it intersects with the pinion at different points, of which line 61 is the line corresponding to a fixed ratio setting, which corresponds to points 40 (see FIG. 28) on the pinion. If rack 50 intersects the pinion at any point between line 61 and point 62, the rack will provide a shorter travel distance of the steering arm attached to it when the pinion intersects the rack on the variable ratio half 53. When rack 50 intersects with the pinion at any point between line 61 and point 63, the rack will provide a longer travel distance of the steering arm attached to it, every time the rack and pinion intersect on the variable ratio half 53. In other words, when the rack is set to its lowest ratio setting, there will be a specific angle of the steering wheel which will correspond to the rack and pinion intersecting at point 62; at that specific steering angle and rack setting, the rack will have moved the steering arm a distance corresponding to the distance between point 55 and point 62, where point 55 is the point where the rack and pinion intersect when the steering wheel is in a straight position, and point 62 the intersection between rack and pinion corresponding to a steering wheel angle given by the particular construction of the rack and pinion set. With the very same steering wheel angle, by changing the rack setting to its highest ratio setting, the rack and the pinion will now intersect at point 63, and the steering arm would have moved the distance corresponding to the distance between points 55 and 63, which is higher than the previously traveled distance between points 55 and 62. This will cause the wheel to increase the Ackermann geometry angle of the vehicle.

Figure 30:
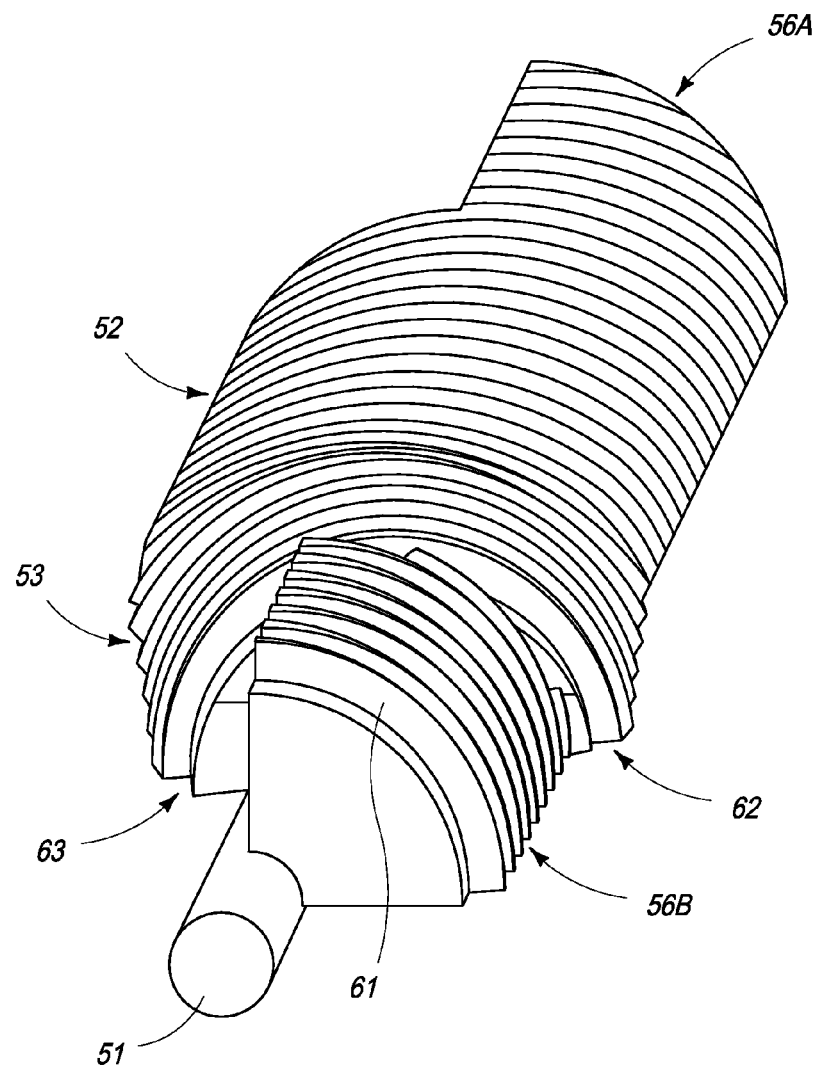
FIG. 30 is a side view of rack 50.

FIG. 30 shows rack 50 composed of axle 51, fixed ratio half 52, variable ratio half 53 and extensions 56a prolonging fixed ratio half 52 and extension 56b prolonging variable ratio half 53. Line 61 is the line where the fixed ratio is constant. All points on variable Ackermann geometry half 53 approaching point 63 are progressively drawing closer to axle 51, where point 63 is the closest; all points on variable Ackermann geometry half 53 approaching point 62 move progressively away from axle 51. The rack turns on its axis 51 and at the same time moves longitudinally on the pinion in order to connect at a point corresponding to the desired ratio on both. Axle 51 is connected to a steering arm (not shown here) and any longitudinal motion of axle 51 directly translates into the same motion for the steering arm; the steering arm, though, is not affected by the radial motion of the rack around axle 51 when the rack accesses different Ackermann geometry settings.

Figure 31:
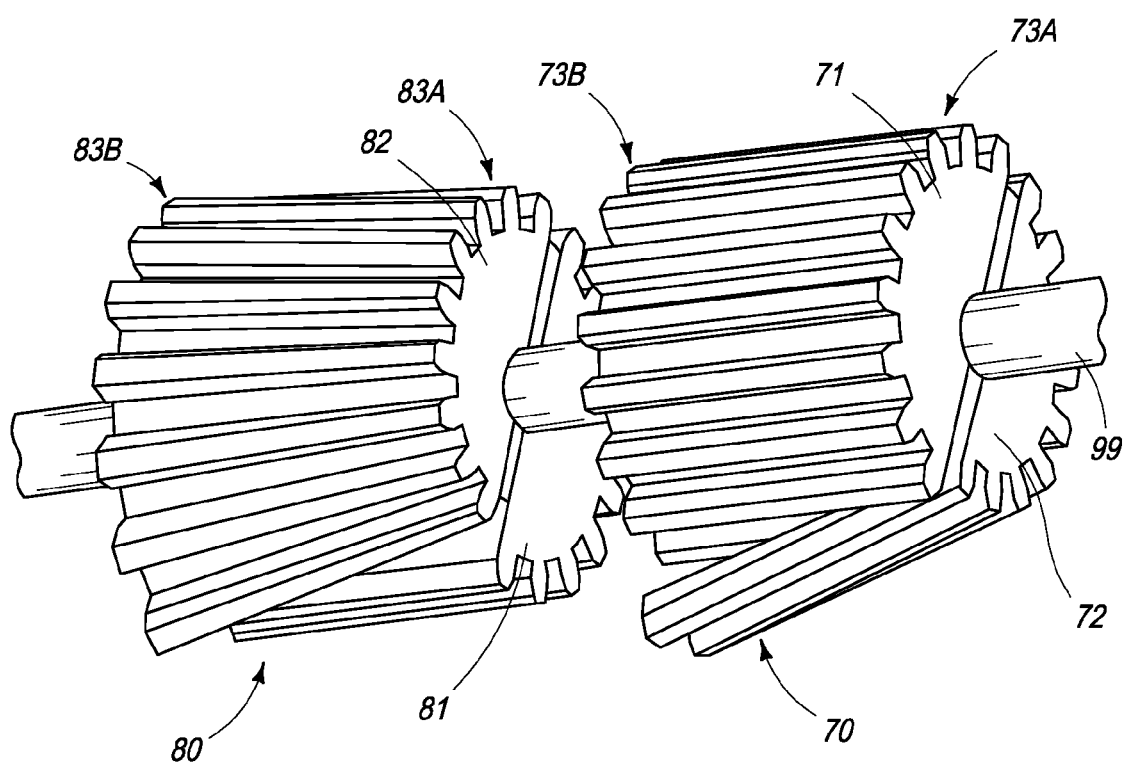
FIG. 31 shows pinions 70 and 80 on steering column 99.

FIG. 31 shows two symmetrical pinions 70 and 80 fixed on steering column 99 which ends on one side with the steering wheel (not shown here). Pinions 70 and 80 are composed respectively of fixed ratio halves 71 and 81 and variable ratio halves 72 and 82. Fixed ratio half 71 of pinion 70 is aligned to variable ratio half 82 of pinion 80 and variable ratio half 72 of pinion 70 is aligned to fixed ratio half 81 of pinion 80.

Figure 32:
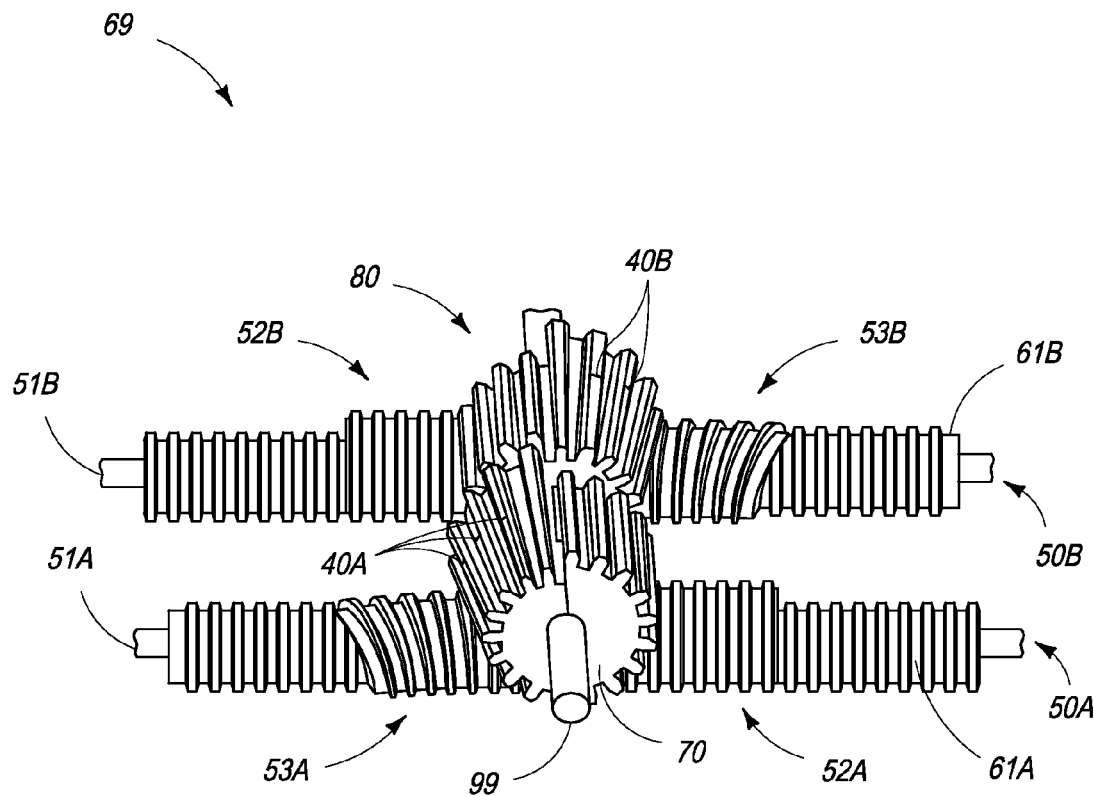
FIG. 32 shows steering system 69.

FIG. 32 shows an assembled steering system 69 where the two pinions 70 and 80 fixed on axle 99 are connected to racks 50A and 50B respectively. The variable ratio halves are inverted to each other both as far as the pinions as well as the racks so that when axle 99 turns clockwise in FIG. 32, rack 50A and pinion 70 forming a first rack/pinion set operate on their fixed ratio halves and at the same time rack 50B and pinion 80 forming a second rack/pinion set operate on their variable ratio halves. When racks 50A and 50B intersect pinion 70 and 80 respectively along lines 61A and 61B, the steering ratio at any angle on either side will remain the same; on the other hand, when both racks 50A and 50B turn to access parallel intersection lines to lines 61A and 61B on either side of these, the two racks will travel a different distance, where one will travel a constant distance because operating on its fixed ratio half, while the other operating on its variable ratio half may travel either a shorter or longer distance in relation to the former.

Figure 33:
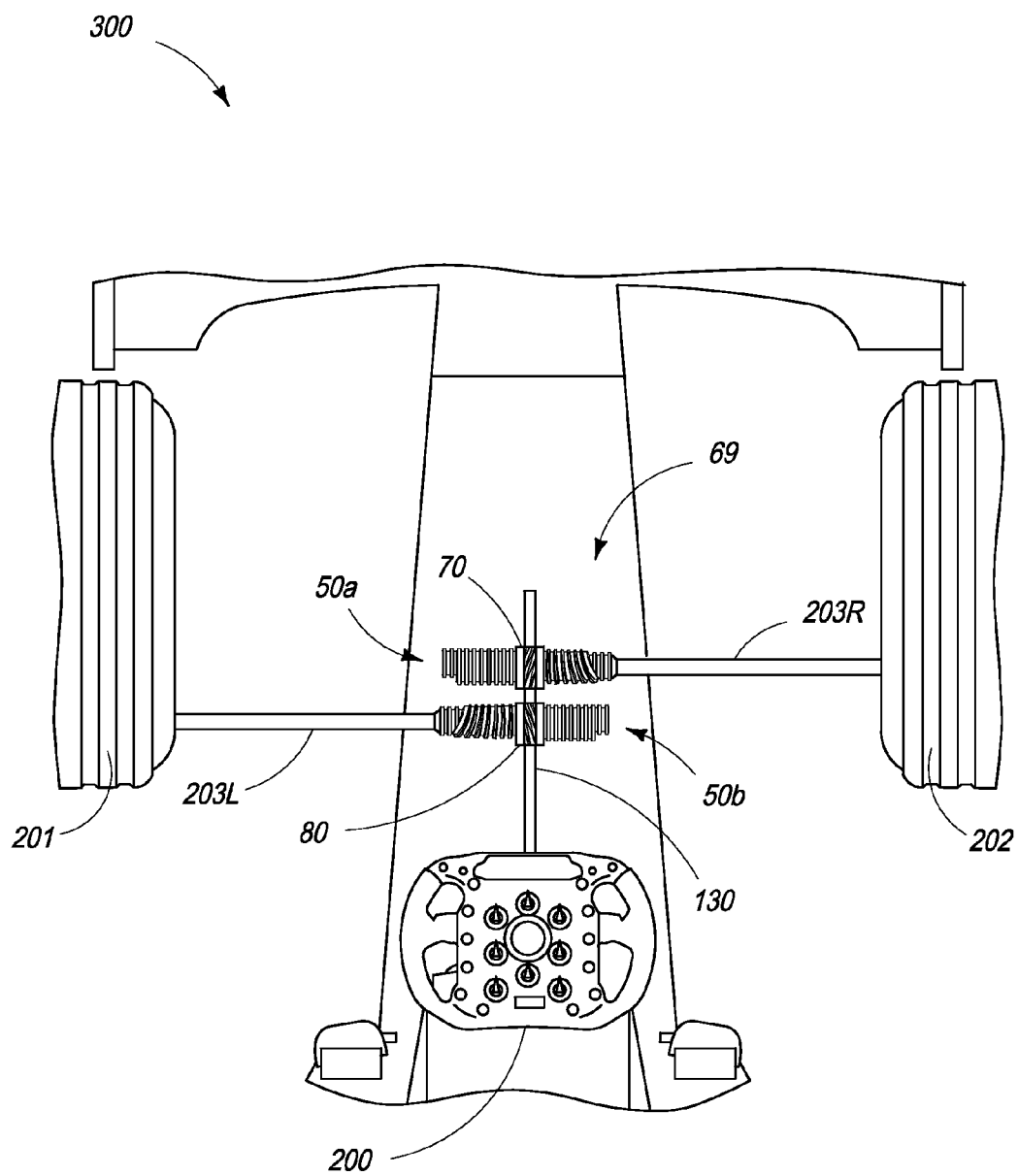
FIG. 33 shows steering system 69 in car 300.

FIG. 33 shows steering system 69 fitted inside car 300 where rack 50A and 50B are coupled respectively with pinions 70 and 80, which are in turn fixed on steering column 130 operated by steering wheel 200 fixed to it; rack 50A is attached to steering arm 203R which turns wheel 202 as soon as rack 50A is set in a lateral motion by the rotation of pinion 70, whereas rack 50B is attached to steering arm 203L which turns wheel 201 at the lateral motion of rack 50B triggered by the rotation of pinion 80.

Figure 34:
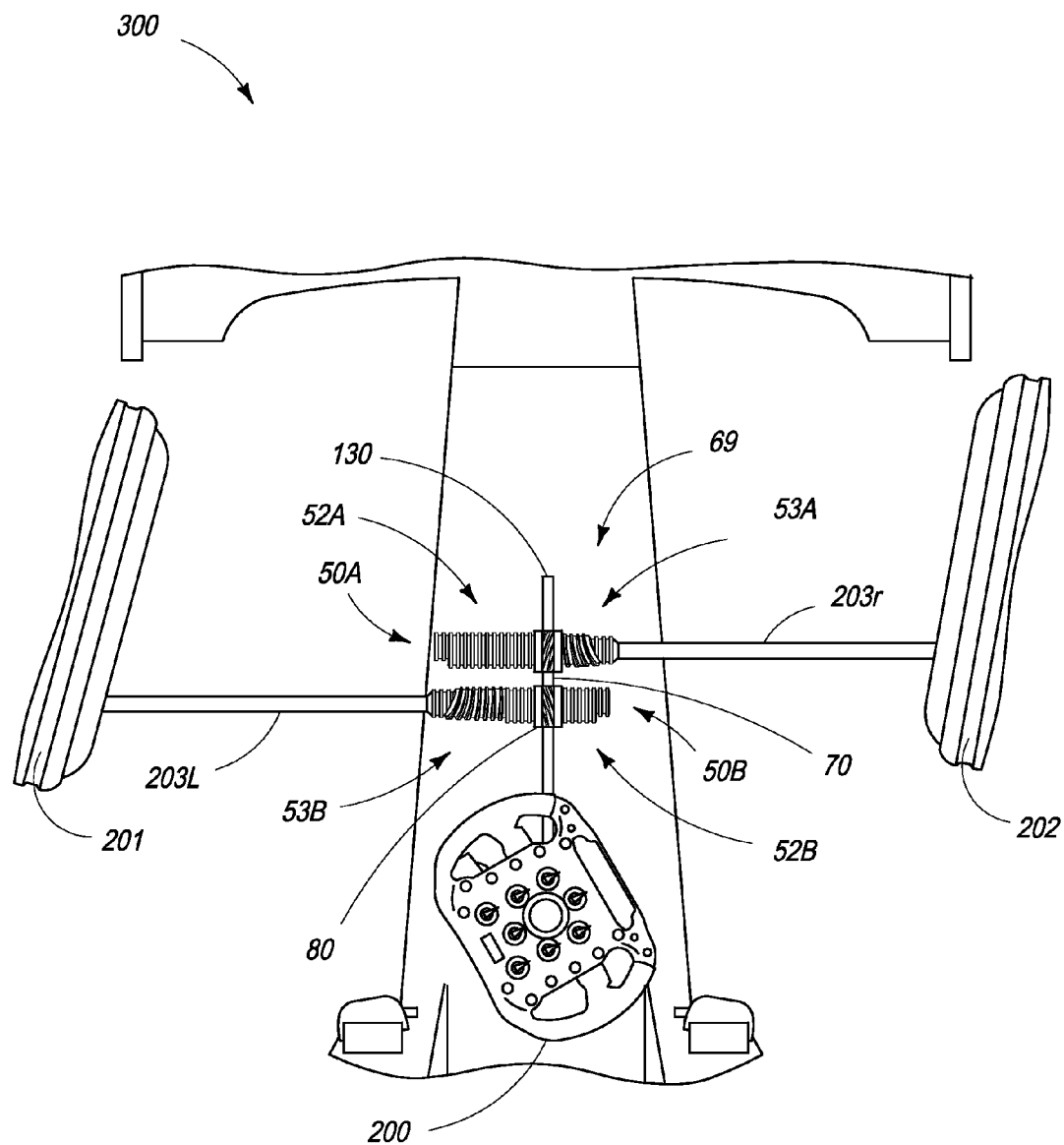
FIG. 34 shows steering system 69 in car 300 making a turn.

FIG. 34 is a view of system 69 during a right turn performed by car 300. It can be seen that system 69 is designed so that the inside wheel always operates on the variable ratio half of one of the two rack/pinion sets. In fact, FIG. 34 shows that as steering wheel 200 turns to the right, it initiates the rotation of steering column 130 which turns pinions 70 and 80; this rotation causes racks 50A and 50B to move laterally; in turn, this motion causes rack 50A to intersect pinion 70 on its variable ratio 53A, while rack 50B intersects pinion 80 on its fixed ratio half 52B. The clockwise rotation of steering wheel 200 signifies that wheel 202 represents the inside wheel of car 300 performing a right turn, while wheel 201 is the outside wheel on any right turn performed by car 300. On the other hand, any counterclockwise rotation of steering wheel 200 will produce a rotation of pinions 70 and 80 resulting in a left turn of car 300, where rack 50A will in this occasion intersect pinion 70 on its fixed ratio half 52A, pushing steering arm 203R which pushes in turn wheel 202 that has now become the outside wheel of vehicle 300; in the case of system 69, as well as in any left turn operated by car 300, rack 50B intersects pinion 80 on its variable ratio half 53B.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. Further, it will be understood that certain features and subcombinations are of utility and may be employed without reference to other features and subcombinations and are contemplated within the scope of the claims. Further, various steps set forth herein may be carried out in orders that differ from those set forth herein without departing from the scope of the present methods. The description should not be restricted to the above embodiments, but should be measured by the claims.

I claim:

1. A steering system, comprising:
    at least two racks, each rack being connected to a steering arm connected in turn to a wheel; and
    one or more pinions fixed on the steering column which is turned for a direction change by the steering wheel, the pinion or pinions being connected to each of the racks, in the measure of either one specially designed pinion for both racks or one for each rack;
    wherein one of the pinions is a conical pinion featuring teeth developing from a small diameter face of the pinion to a large diameter face of the pinion.

2. The system of claim 1, wherein each rack has teeth developing on a curved surface.

3. The system of claim 2, wherein the curved surface can range in a radial sense from a 360° cylinder to a 1° cylinder section.

4. The system of claim 1, in which the racks are adjustable on their longitudinal axis to access different intersecting points with their respective pinion independently from each other, whereby setting different travel distances for their respective steering arms for the same angle of steering wheel.

5. The system of claim 1, wherein the rack includes multiple sections dividing the rack lengthwise, the sections having different ratio settings from one another, so that when the steering wheel turns to one side the rack travels a different length from the distance it travels when the steering wheel turns to an opposite side at the same angle.

6. The system of claim 1, wherein:
    two pinions are fixed on the steering column; and
    the two racks are rotatable on their axis to move on their respective pinion longitudinally in a synchronous way.

7. The system of claim 1, wherein the two racks are rotatable on their axis to move longitudinally independently of each other.

8. A steering system, comprising:
    at least two racks, each rack being connected to a steering arm connected in turn to a wheel; and
    one or more pinions fixed on the steering column which is turned for a direction change by the steering wheel, the pinion or pinions being connected to each of the racks, in the measure of either one specially designed pinion for both racks or one for each rack;
    wherein one of the pinions includes two radial sections featuring a different ratio to each other, so that for an equal steering wheel angle on either side, the pinion will make the connected rack travel a different length one side from the other.

9. The system of claim 8, in which the racks are adjustable on their longitudinal axis to access different intersecting points with their respective pinion independently from each other, whereby setting different travel distances for their respective steering arms for the same angle of steering wheel.

10. The system of claim 8, wherein the rack includes multiple sections dividing the rack lengthwise, the sections having different ratio settings from one another, so that when the steering wheel turns to one side the rack travels a different length from the distance it travels when the steering wheel turns to an opposite side at the same angle.

11. The system of claim 8, wherein:
    two pinions are fixed on the steering column; and
    the two racks are rotatable on their axis to move on their respective pinion longitudinally in a synchronous way.

12. The system of claim 8, wherein the two racks are rotatable on their axis to move longitudinally independently of each other.

* * * * *